US012811084B2

(12) United States Patent
Yoneda

(10) Patent No.: US 12,811,084 B2
(45) **Date of Patent: *Nov. 24, 2026**

(54) PROTECTIVE ELEMENT

(71) Applicant: DEXERIALS CORPORATION, Shimotsuke (JP)

(72) Inventor: Yoshihiro Yoneda, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 270 days.

This patent is subject to a terminal disclaimer.

(21) Appl. No.: 18/687,869

(22) PCT Filed: Aug. 26, 2022

(86) PCT No.: PCT/JP2022/032201
§ 371 (c)(1),
(2) Date: Feb. 29, 2024

(87) PCT Pub. No.: WO2023/032843
PCT Pub. Date: Mar. 9, 2023

(65) Prior Publication Data

US 2024/0379313 A1 Nov. 14, 2024

(30) Foreign Application Priority Data

Sep. 3, 2021 (JP) ................................ 2021-144287
Jul. 25, 2022 (JP) ................................ 2022-118087

(51) Int. Cl.
*H01H 85/10* (2006.01)
*H01H 37/76* (2006.01)
(Continued)

(52) U.S. Cl.
CPC ........ *H01H 85/10* (2013.01); *H01H 85/0417* (2013.01); *H01H 85/06* (2013.01);
(Continued)

(58) Field of Classification Search
CPC .... H01H 85/10; H01H 85/0417; H01H 85/06; H01H 85/12; H01H 85/2045;
(Continued)

(56) References Cited

U.S. PATENT DOCUMENTS 5,207,590 A 5/1993 Benda
10,128,074 B2 * 11/2018 Lorenzon ............ H01H 71/025
(Continued)

FOREIGN PATENT DOCUMENTS

JP 2016110742 A 6/2016
JP 2017004634 A 1/2017
(Continued)

OTHER PUBLICATIONS

Fukuda, Yoshihisa; Kinoshita, Kazuhisa; Kimoto, Shinya; Kanematsu, Kenji; Nakamura, Masato, "Contact Device and Breaker Device", Mar. 19, 2020, Panasonic Ip Man Co Ltd, Entire Document (Translation of WO 2020054432). (Year: 2020).*
(Continued)

*Primary Examiner* — Stephen S Sul
(74) *Attorney, Agent, or Firm* — Element IP, PLC

(57) ABSTRACT

A protective element includes: a fuse element including a first end portion and a second end portion; first and second insulating members each having an opening or a separation part, the first and second insulating members being disposed in a state proximal to or in contact with the fuse element; a shielding member movable in a moving direction that allows the shielding member to insert into the opening or the separation part so as to divide the fuse element; a locking member that suppresses movement of the shielding member; a pressing member that press the shielding member; and a heat-generating body configured to heat the locking member or a fixing member of the locking member.

26 Claims, 16 Drawing Sheets

(51) Int. Cl.

| | |
|---|---|
| ***H01H 85/041*** | (2006.01) |
| ***H01H 85/06*** | (2006.01) |
| ***H01H 85/12*** | (2006.01) |
| ***H01H 85/20*** | (2006.01) |

(52) U.S. Cl.
CPC ........ *H01H 85/12* (2013.01); *H01H 85/2045* (2013.01); *H01H 37/761* (2013.01); *H01H 2037/763* (2013.01)

(58) Field of Classification Search
CPC ........... H01H 37/761; H01H 2037/763; H01H 85/0241; H01H 2085/383; H01H 37/76; H01H 85/08; H01H 85/143; H01H 85/175; H01H 85/18; H01H 39/00; H01H 39/006; H01H 2039/008
See application file for complete search history.

(56) References Cited

U.S. PATENT DOCUMENTS

| | | | | |
|---|---|---|---|---|
| 2015/0294828 | A1* | 10/2015 | Burge | H01H 85/38 337/274 |
| 2015/0348732 | A1* | 12/2015 | Douglass | H01H 85/175 337/198 |
| 2016/0013001 | A1* | 1/2016 | Yoneda | H01H 85/06 337/290 |
| 2016/0071680 | A1* | 3/2016 | Mukai | H01H 37/761 337/183 |
| 2016/0240342 | A1* | 8/2016 | Yoneda | H01H 85/08 |
| 2017/0236675 | A1* | 8/2017 | Aberin | H01H 85/165 337/159 |
| 2022/0084773 | A1 | 3/2022 | Yoneda et al. | |
| 2022/0285114 | A1* | 9/2022 | Nakamura | H01H 39/00 |
| 2022/0319792 | A1 | 10/2022 | Yoneda | |
| 2025/0118520 | A1* | 4/2025 | Wada | H01H 85/12 |

FOREIGN PATENT DOCUMENTS

| | | | | |
|---|---|---|---|---|
| JP | 2020145051 | A | 9/2020 | |
| JP | 2021022431 | A | 2/2021 | |
| TW | 202109583 | A | 3/2021 | |
| WO | WO-2020054432 | A1 * | 3/2020 | H01H 39/00 |

OTHER PUBLICATIONS

International Search Report issued Nov. 1, 2022 in PCT/JP2022/032201 (with English translation), 4 pages.
International Preliminary Report on Patentability issued Jul. 26, 2023, in PCT/JP2022/032201 (with English translation), 10 pages.
Office Action issued Mar. 31, 2025, in corresponding Korean Patent Application No. 10-2024-7006242 (with machine English translation), 19 pages.
Written Opinion of the International Searching Authority issued Nov. 1, 2022, in PCT/JP2022/032201 (with machine English translation), 9 pages.
Combined Taiwanese Office Action and Search Report issued Feb. 26, 2026, in corresponding Taiwanese Patent Application No. 111133387 (with machine English translation), 17 pages.
Office Action issued Jun. 30, 2026, in corresponding Japanese Patent Application No. 2022-118087 (with machine English translation), 12 pages.
Combined Chinese Office Action and Search Report issued Sep. 10, 2026, in corresponding Chinese Patent Application No. 202280057962.3 (with machine English translation), 18 pages.

* cited by examiner

PROTECTIVE ELEMENT

TECHNICAL FIELD

The present invention relates to a protective element.

The present invention claims priority to JP 2021-144287 filed in Japan on Sep. 3, 2021 and JP 2022-118087 filed in Japan on Jul. 25, 2022, and the contents of these applications are hereby incorporated.

BACKGROUND ART

Conventionally, there are fuse elements wherein heat is generated and fusion occurs when a current that exceeds a rated value flows in a current path, thereby cutting off the current path. A protective element provided with a fuse element (fuse element) is used in a wide variety of fields such as home electric appliances and electric automobiles.

For example, Patent Literature 1 teaches a fuse element provided with two elements connected between terminal portions positioned at both end portions and a fusion portion provided in a substantially central portion of the elements as a fuse element used mainly in electric circuits for an automobile or the like. Patent Literature 1 teaches a fuse wherein a two-piece fuse element is stored inside a casing and an arc extinguishing material is enclosed between the fuse element and the casing.

PRIOR ART LITERATURE

Patent Literature

Patent Literature 1: Japanese Unexamined Patent Application Publication No. 2017-004634

SUMMARY OF THE INVENTION

Problem to be Solved by the Invention

In a protective element disposed in a current path having high voltage and high current, arc discharge is likely to occur when a fuse element fuses. When large-scale arc discharge occurs, an insulating case which houses the fuse element may undergo breakdown. Therefore, by using a metal such as copper that has low resistance and a high melting point as a material for the fuse element, the occurrence of arc discharge is suppressed. Moreover, a material such as ceramic that is rugged and highly heat resistant is used as a material for the insulating case, and the size of the insulating case is further enlarged.

Moreover, high voltage/high current (100 V/100 A or more) fuses up until now have been merely for overcurrent cutoff, and have not accomplished both overcurrent cutoff and a cutoff function via a cutoff signal.

In light of the above circumstances, an object of the present invention is to provide a protective element wherein large-scale arc discharge does not readily occur when a fuse element fuses, the size of an insulating case can be made smaller and lighter, and both overcurrent cutoff in response to a high voltage/high current and a cutoff function via a cutoff signal are accomplished.

Means for Solving the Problem

The present invention provides the following means for solving the problem described above.

[1] A protective element including a fuse element, an insulating case that houses the fuse element, a first terminal, and a second terminal, further including:

a first insulating member having a first opening or a first separation part and a second insulating member having a second opening or a second separation part, and arranged in a state proximal to or in contact with the fuse element;

a shielding member that can move through the first opening or the first separation part of the first insulating member and the second opening or the second separation part of the second insulating member in a direction that allows for insertion into the first opening or the first separation part, so as to divide the fuse element;

pressing means that press the shielding member in the direction that the shielding member is able to move;

a locking member that suppresses movement of the shielding member;

a heat-generating body that heats and softens the locking member or a fixing member fixing the locking member; and a power supply member that carries current to the heat-generating body, wherein the fuse element includes a first end portion and a second end portion that face each other, in which the first terminal has one end connected to the first end portion and the other end portion exposed to the outside by the insulating case and the second terminal has one end connected to the second end portion and the other end portion exposed to the outside by the insulating case, and the insulating case further houses the first insulating member, the second insulating member, the shielding member, the pressing means, the locking member, the heat-generating body, and one part of the power supply member.

[2] The protective element of [1], wherein the heat-generating body generates heat and the locking member or the fixing member softens, by which stress of the pressing means causes the shielding member to cut or release the locking member, and furthermore, the shielding member moves through the second opening or the second separation part of the second insulating member and the first opening or the first separation part of the first insulating member to cut the fuse element, which cuts off energization of the fuse element.

[3] The protective element of [1] or [2], wherein the shielding member cuts the fuse element, shielding the fuse element in the current carrying direction of the fuse element.

[4] The protective element of any of [1] to [3], wherein the pressing means is a spring.

[5] The protective element of any of [1] to [4], wherein at least one among the first insulating member, the second insulating member, the shielding member, and the insulating case is formed of a material having a tracking resistance index CTI of 500 V or more.

[6] The protective element of any of [1] to [5], wherein at least one among the first insulating member, the second insulating member, the shielding member, and the insulating case is formed of a resinous material of a type selected from a group consisting of polyamide-based resins and fluorine-based resins.

[7] The protective element of any of [1] to [6], wherein the fuse element includes a stacked body containing a low melting point metal layer and a high melting point metal layer in at least a portion thereof, the low melting point metal layer contains tin, and the high melting point metal layer contains silver or copper.

[8] The protective element of [7], wherein the fuse element includes two or more layers of the high melting point metal layer and one or more layers of the low melting point metal layer, and includes a stacked body where the low melting point metal layer is arranged between the high melting point metal layers in at least a portion thereof.

[9] The protective element of any of [1] to [8], wherein the fuse element includes a single layer containing silver or copper in at least a portion thereof.

[10] The protective element of any of [1] to [9], wherein the fuse element includes a fusion portion between the first end portion and the second end portion, in which the cross-sectional area of the fusion portion in the current carrying direction is less than the cross-sectional area of the first end portion and the second end portion in the current carrying direction from the first end portion to the second end portion.

[11] The protective element of any of [1] to [10], wherein one part of the locking member is in proximity to or in contact with the fuse element.

[12] The protective element of any of [1] to [11], wherein the insulating case is made up of at least two case components, in which one of the case components is integral with the first insulating member and the other case component is integral with the second insulating member, or the one case component is integral with the first insulating member or the other case component is integral with the second insulating member.

[13] The protective element of any of [1] to [12], wherein the insulating case is made up of at least two case components, and the fuse element is interposed between one of the case components and the other case component.

[14] A protective element including a fuse element, an insulating case that houses the fuse element, a first terminal, and a second terminal, further including:

a first insulating member formed having a first opening or a first separation part and arranged in a state proximal to or in contact with the fuse element;

a shielding member that can move through the first opening or the first separation part of the first insulating member in a direction that allows for insertion into the first opening or the first separation part, so as to divide the fuse element;

pressing means that press the shielding member in the direction that the shielding member is able to move, and a locking member that suppresses movement of the shielding member, wherein the fuse element includes a first end portion and a second end portion that face each other, in which the first terminal has one end connected to the first end portion and the other end portion exposed to the outside by the insulating case and the second terminal has one end connected to the second end portion and the other end portion exposed to the outside by the insulating case, and the insulating case further houses the first insulating member, the shielding member, the pressing means, and the locking member.

[15] The protective element of [14], wherein the shielding member cuts the fuse element, shielding the fuse element in the current carrying direction of the fuse element.

[16] The protective element of or [15], wherein the pressing means is a spring.

[17] The protective element of any of to [16], wherein at least one among the first insulating member, the shielding member, and the insulating case is formed of a material having a tracking resistance index CTI of 500 V or more.

[18] The protective element of any of to [17], wherein at least one among the first insulating member, the shielding member, and the insulating case is formed of a resinous material of a type selected from a group consisting of polyamide-based resins and fluorine-based resins.

[19] The protective element of any of to [18], wherein the fuse element includes a stacked body containing a low melting point metal layer and a high melting point metal layer in at least a portion thereof, the low melting point metal layer contains tin, and the high melting point metal layer contains silver or copper.

[20] The protective element of [19], wherein the fuse element includes two or more layers of the high melting point metal layer and one or more layers of the low melting point metal layer, and includes a stacked body where the low melting point metal layer is arranged between the high melting point metal layers in at least a portion thereof.

[21] The protective element of any of to [20], wherein the fuse element includes a single layer containing silver or copper in at least a portion thereof.

[22] The protective element of any of to [21], wherein the fuse element includes a fusion portion between the first end portion and the second end portion, in which the cross-sectional area of the fusion portion in the current carrying direction is less than the cross-sectional area of the first end portion and the second end portion in the current carrying direction from the first end portion to the second end portion.

[23] The protective element of any of to [22], wherein one part of the locking member is in proximity to or in contact with the fuse element.

[24] The protective element of any of to [23], wherein the first insulating member, which is arranged in a state proximal to or in contact with an outer side of the fuse element, includes a locking member holding part that holds the locking member.

[25] The protective element of any of to [24], wherein the insulating case is made up of at least two case components, in which one of the case components is integral with the first insulating member.

[26] The protective element of any of to [25], wherein the insulating case is made up of at least two case components, and the fuse element is interposed between one of the case components and the other case component.

[27] The protective element of any of to [26], further including a heat-generating body that heats and softens the locking member or a fixing member fixing the locking member, and a power supply member that carries current to the heat-generating body, wherein the heat-generating body generates heat and the locking member or the fixing member softens, by which stress of the pressing means causes the shielding member to cut or release the locking member, and furthermore, the shielding member moves through the first opening or the first separation part of the first insulating member to cut the fuse element, which cuts off energization of the fuse element.

Effect of the Invention

According to the present invention, it is possible to provide a protective element wherein large-scale arc discharge does not readily occur when a fuse element fuses, the size of an insulating case can be made smaller and lighter, and both overcurrent cutoff in response to a high voltage/high current and a cutoff function via a cutoff signal are accomplished.

EMBODIMENTS OF THE INVENTION

Figure 1:
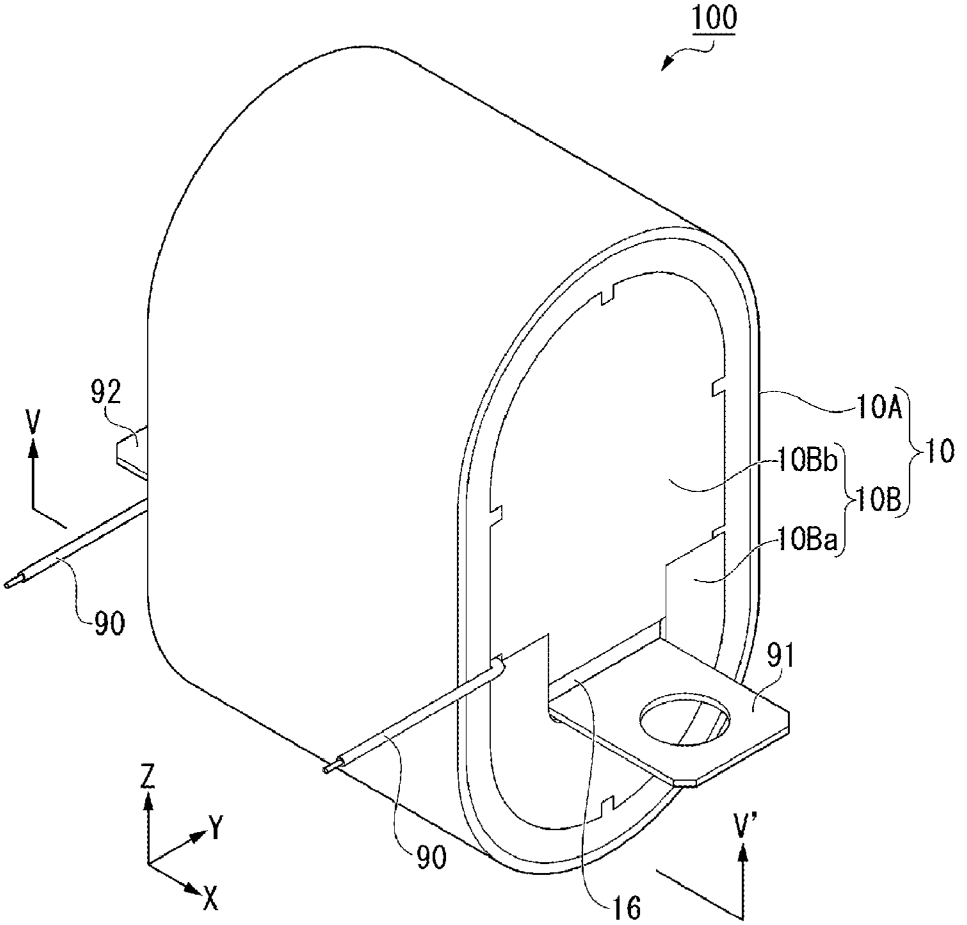
FIG. 1 is a perspective view of the protective element according to the first embodiment of the present invention.

The present embodiment will be described in detail below with reference to drawings as appropriate. In the drawings used in the following description, characteristic portions may be enlarged for convenience to more easily understand the characteristics thereof, and the dimensional ratios of each constituent element and the like may be different from the actual ratios. The materials, dimensions, and the like exemplified in the following description are mere examples, and the present invention is not limited thereby. The present invention can be implemented by making appropriate modifications as long as the effect of the present invention is demonstrated.

Protective Element (First Embodiment)

FIG. 1 to FIG. 5 are schematic diagrams illustrating the protective element according to the first embodiment of the present invention. In the drawings used in the following description, the direction indicated by X is the current carrying direction of the fuse element. The direction indicated by Y is a direction orthogonal to the X direction, and is also referred to as the width direction. The direction indicated by Z is a direction orthogonal to the X direction and the Y direction, and is also referred to as the thickness direction.

Figure 2:
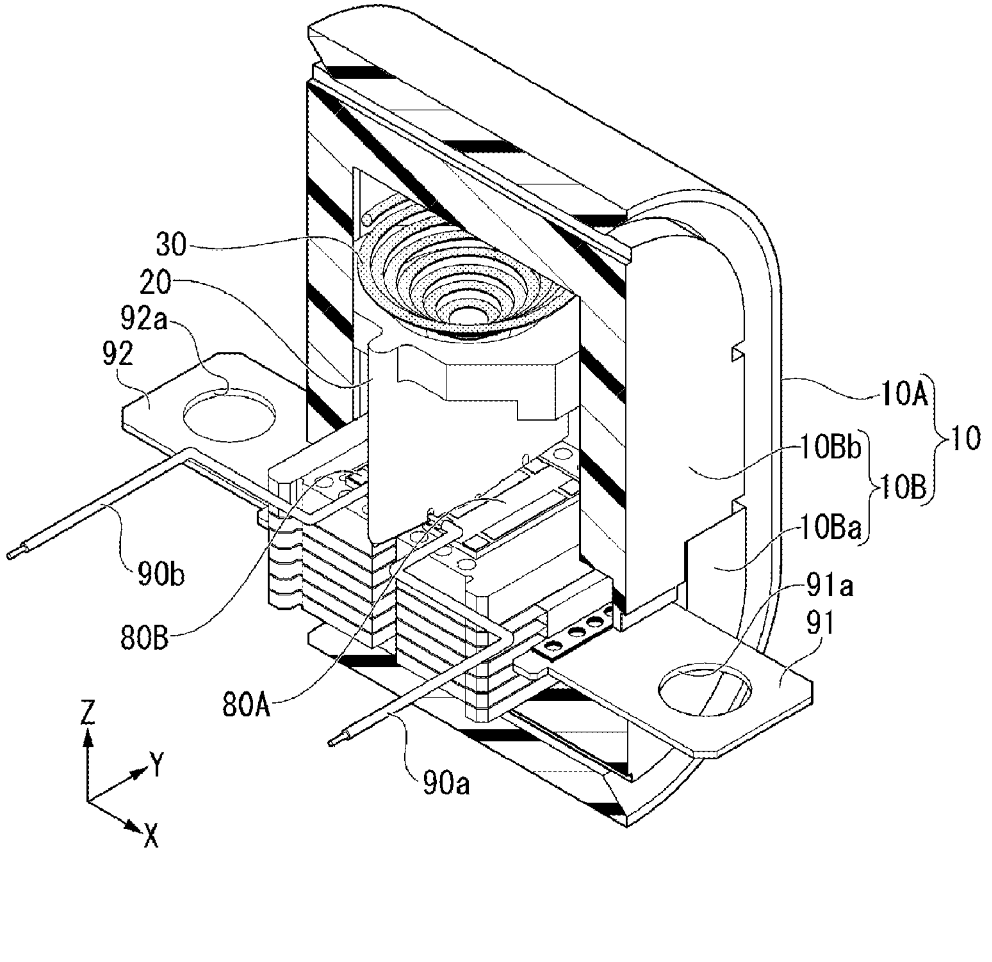
FIG. 2 is a partial perspective view for viewing the interior of the protective element illustrated in FIG. 1.
Figure 3:
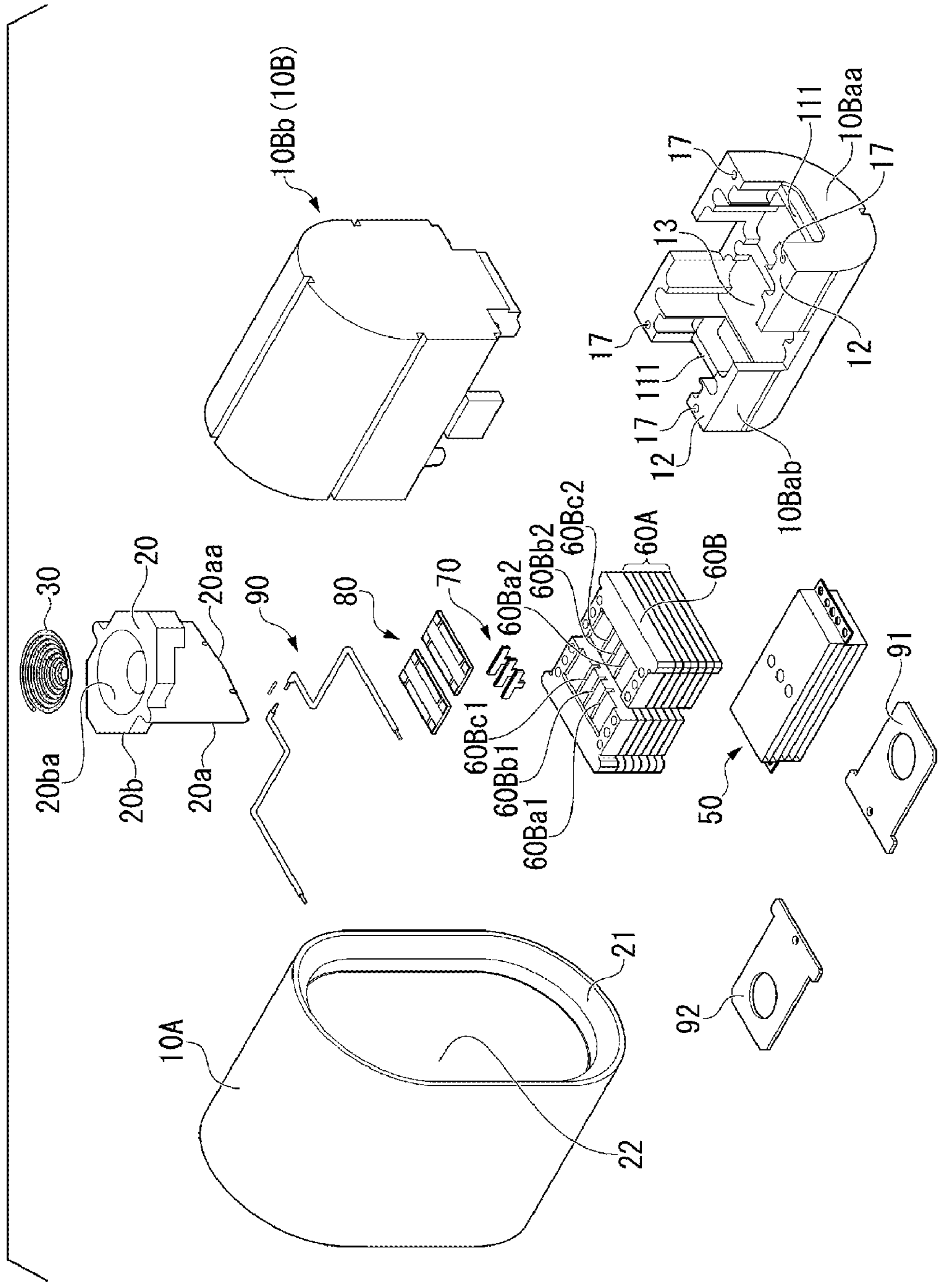
FIG. 3 is an exploded perspective view of the protective element illustrated in FIG. 1.
Figure 4:
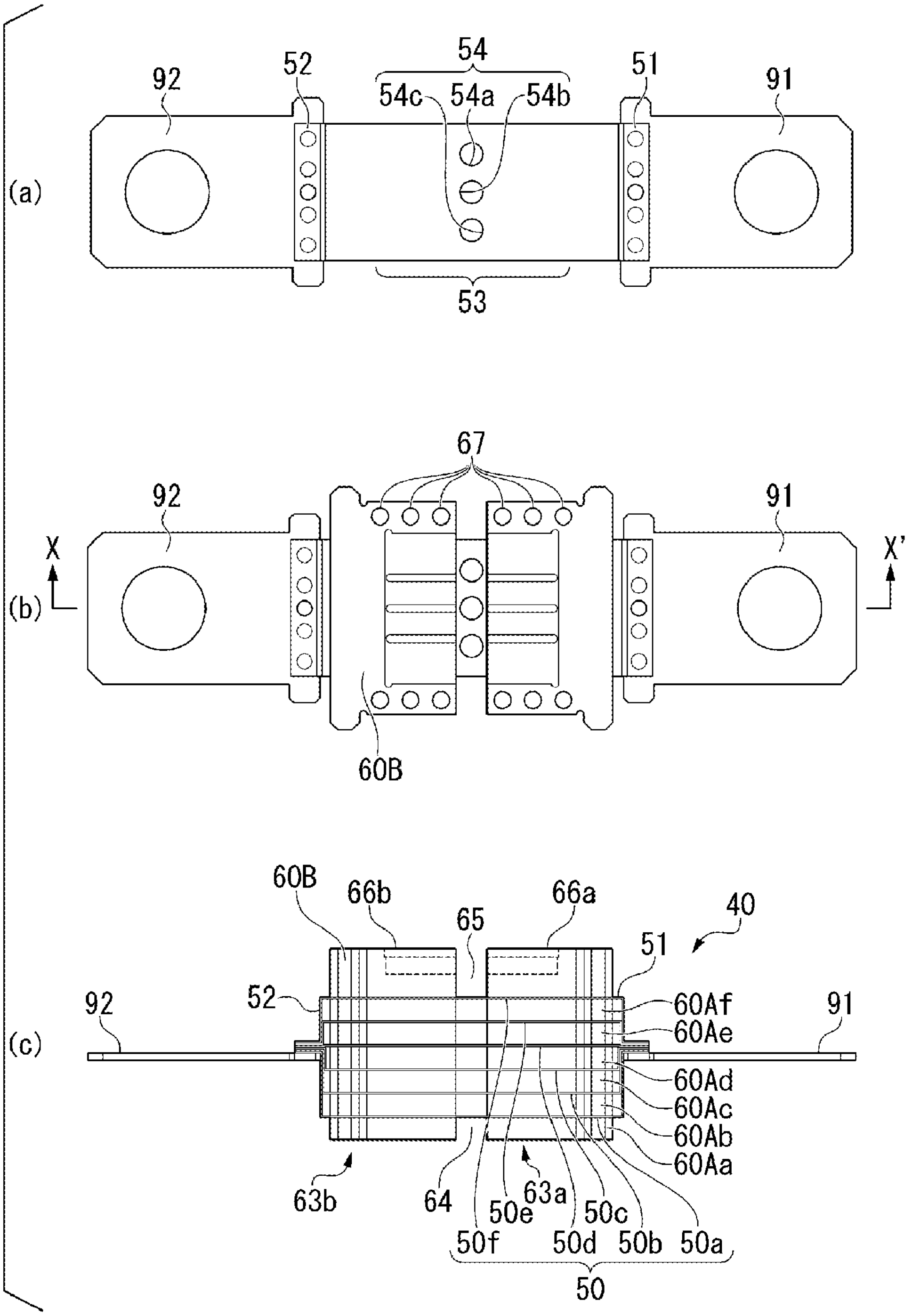
FIG. 4(*a*) is a plan view schematically illustrating a first terminal, a second terminal, and one fusible conductor sheet configuring a fuse element stacked body, (b) is a plan view schematically illustrating the fuse element stacked body, a second insulating member, the first terminal, and the second terminal, and (c) is a cross-sectional view along the X-X' line in the plan view illustrated in (b).
Figure 5:
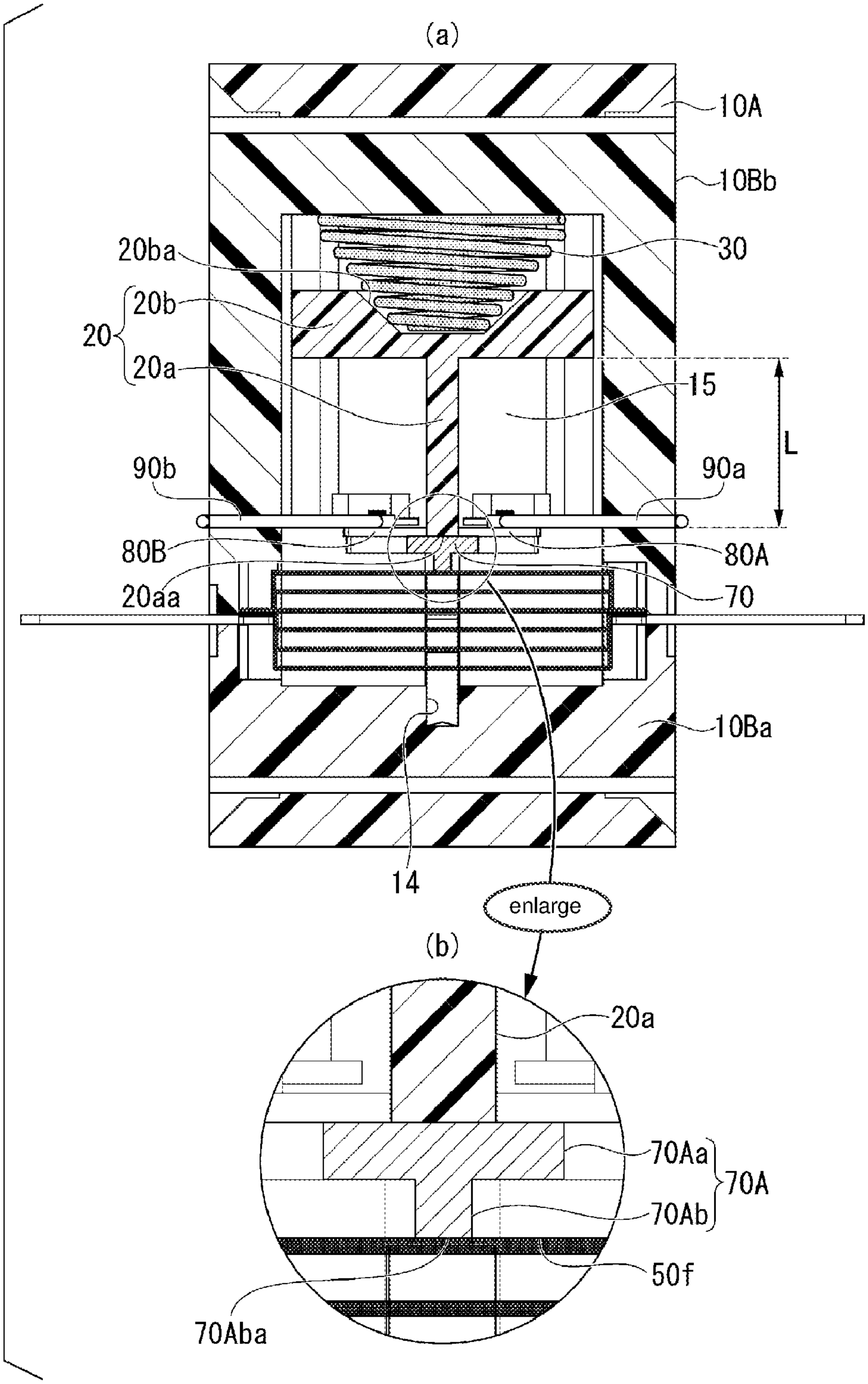
FIG. 5(*a*) is a cross-sectional view along the V-V' line in FIG. 1, and (b) is an enlarged view of the vicinity of a locking member.

FIG. 1 is a perspective view schematically illustrating the protective element according to the first embodiment of the present invention. FIG. 2 is a partial perspective view schematically illustrated for viewing the interior of the protective element illustrated in FIG. 1. FIG. 3 is an exploded perspective view schematically illustrating the protective element illustrated in FIG. 1. FIG. 4(*a*) is a plan view schematically illustrating a first terminal, a second terminal, and one fusible conductor sheet configuring a fuse element stacked body, (b) is a plan view schematically illustrating the fuse element stacked body, a second insulating member, the first terminal, and the second terminal, and (c) is a cross-sectional view along the X-X' line in the plan view illustrated in (b). FIG. 5(*a*) is a cross-sectional view along the V-V' line in FIG. 1, and (b) is an enlarged view of the vicinity of a locking member.

The protective element 100 illustrated in FIG. 1 to FIG. 5 has an insulating case 10, a fuse element stacked body 40, a first insulating member 60A, a second insulating member 60B, a shielding member 20, pressing means 30, a locking member 70, a heat-generating body 80, power supply members 90*a* and 90*b*, a first terminal 91, and a second terminal 92. Note that in the protective element 100 of the present embodiment, the current carrying direction means the direction in which electricity flows during use (X direction), and the cross-sectional area of the current carrying direction means the area of the surface (Y-Z surface) in the direction orthogonal to the current carrying direction.

In the protective element 100 illustrated in FIG. 1 to FIG. 5, an example is illustrated wherein the first insulating member 60A and the second insulating member 60B are members having different configurations, but the first insulating member 60A and second insulating member 60B here may be members having the same configuration.

The protective element 100 of the present embodiment has, as mechanisms for cutting off the current path, an overcurrent cutoff that cuts off the current path by a fusible conductor sheet 50 fusing when an overcurrent that exceeds a rated current flows through the fusible conductor sheet 50 (see FIG. 4(*c*)), and an active cutoff that cuts off the current path by melting the locking member 70 that suppresses movement of the shielding member 20 by carrying a current to the heat-generating body 80 when an abnormality other than overcurrent occurs, moving the shielding member 20, on which a pressing force is applied downward by the pressing means 30, and cutting the fuse element 50.

(Insulating Case)

The insulating case 10 has a substantially oblong cylindrical shape (an ellipse at any position where a cross section on the Y-Z surface is in the X direction). The insulating case 10 is made up of a cover 10A and a holding member 10B.

The cover 10A is an elongated cylindrical shape that is open on both ends. The inside edges of the openings of the cover 10A are chamfered inclined surfaces 21. A central portion of the cover 10A is a housing portion 22 for housing the holding member 10B.

The holding member 10B is made up of a first holding member 10Ba arranged on the lower side in the Z direction and a second holding member 10Bb arranged on the upper side in the Z direction.

As illustrated in FIG. 3, a terminal mounting surface 111 is provided on both end portions (first end portion 10Baa and second end portion 10Bab) of the first holding member 10Ba in the current carrying direction (X direction).

Moreover, as illustrated in FIG. 3, a power supply member mounting surface 12 is provided on both end portions (the first end portion 10Baa and the second end portion 10Bab) of the first holding member 10Ba. The routing distance of the power supply member 90 is shortened by the position (height) in the Z direction of the power supply member mounting surface 12 being substantially the same height as the position (height) of the heat-generating body 80.

Figure 6:
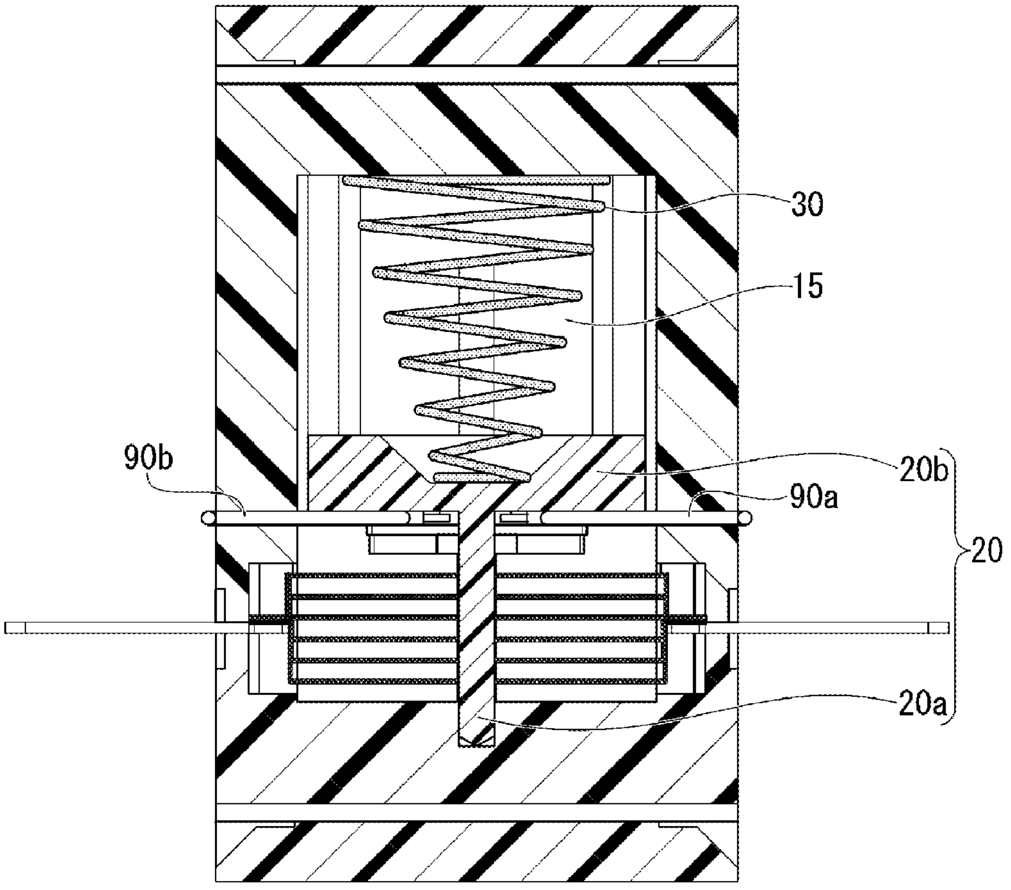
FIG. 6 is a cross-sectional view of the protective element in a state wherein a shielding member cuts the fuse element and is all the way down.

An internal pressure buffer space 15 (see FIG. 5(*a*) and FIG. 6) is formed inside the holding member 10B. The internal pressure buffer space 15 acts to suppress rapid rises in internal pressure in the protective element 100 by gas generated by arc discharge caused when the fuse element stacked body 40 fuses.

The cover 10A and the holding member 10B are preferably formed of a material having a tracking resistance index CTI (resistance to tracking (carbonized conduction path) breakdown) of 500 V or more. The tracking resistance index CTI can be found by testing based on IEC60112.

A resin material can be used as the material for the cover 10A and the holding member 10B. Resin materials have a lower heat capacity and a lower melting point than ceramic materials. Therefore, it is preferable to use a resin material as the material of the holding member 10B, due to the characteristic wherein an arc discharge is weakened due to gasification cooling (ablation), and the characteristic wherein melted and scattered metal particles, when adhering to the holding member 10B, are sparse and an electrically conductive path does not readily form from the surface of the holding member 10B being deformed and adherents being coagulated.

For example, a polyamide-based resin or a fluorine-based resin can be used as the resin material. The polyamide-based resin may be an aliphatic polyamide or a semi-aromatic polyamide. Examples of an aliphatic polyamide include nylon 4, nylon 6, nylon 46, and nylon 66. Examples of a semi-aromatic polyamide include nylon 6T, nylon 9T, and polyphthalamide (PPA) resin. An example of a fluorine-based resin includes polytetrafluoroethylene. Moreover, polyamide-based resins and fluorine-based resins have high heat resistance and do not readily burn. In particular, aliphatic polyamides do not readily generate graphite even when burned. Therefore, forming the cover 10A and the holding member 10B using an aliphatic polyamide makes it possible to reliably prevent a new current path from being formed by graphite generated during arc discharge when the fuse element stacked body 40 fuses.

(Fuse Element Stacked Body)

The fuse element stacked body includes a plurality of fusible conductor sheets (a plurality of fusible conductor sheets may collectively be referred to as a fuse element) arranged in parallel in the thickness direction, and a plurality of the first insulating member, which is arranged between each of the plurality of fusible conductor sheets and arranged on the lowermost of the plurality of fusible conductor sheets, in a state proximal to or in contact with the fusible conductor sheets, and in which a first opening or a first separation part is formed. The fuse element stacked body is made up of the fuse element and the first insulating member.

The fuse element stacked body 40 has six fusible conductor sheets 50*a*, 50*b*, 50*c*, 50*d*, 50*c*, and 50*f* arranged in parallel in the thickness direction (Z direction). First insulating members 60Ab, 60Ac, 60Ad, 60Ac, and 60Af are arranged between each of the fusible conductor sheets 50*a* to 50*f*. The first insulating members 60Aa to 60Af are arranged in a state proximal to or in contact with each of the fusible conductor sheets 50*a* to 50*f*. When in a proximal state, the distance between the first insulating members 60Ab to 60Af and the fusible conductor sheets 50*a* to 50*f* is preferably 0.5 mm or less, and more preferably 0.2 mm or less.

Moreover, the first insulating member 60Aa is arranged on an outer side of the fusible conductor sheet 50*a* arranged on the lowermost of the fusible conductor sheets 50*a* to 50*f*. Additionally, the second insulating member 60B is arranged on an outer side of the fusible conductor sheet 50*f* arranged on the uppermost of the fusible conductor sheets 50*a* to 50*f*.

The width (length in the Y direction) of the fusible conductor sheets 50*a* to 50*f* is narrower than the width of the first insulating members 60Aa to 60Af and the second insulating member 60B.

The fuse element stacked body 40 is an example wherein the number of fusible conductor sheets is six, but the present invention is not limited to six, and is sufficient as long as there is a plurality.

Each of the fusible conductor sheets 50*a* to 50*f* has a first end portion 51 and a second end portion 52 that face each other, and a fusion portion 53 positioned between the first end portion 51 and the second end portion 52. Among the fusible conductor sheets 50*a* to 50*f* arranged in parallel in the thickness direction, the first end portion 51 of the three fusible conductor sheets 50*a* to 50*c* from the bottom is connected to the lower surface of the first terminal 91, and the first end portion 51 of the three fusible conductor sheets 50*d* to 50*f* from the top is connected to the upper surface of the first terminal 91. Moreover, among the fusible conductor sheets 50*a* to 50*f*, the second end portion 52 of the three fusible conductor sheets 50*a* to 50*c* from the bottom is connected to the lower surface of the second terminal 92, and the second end portion 52 of the three fusible conductor sheets 50*d* to 50*f* from the top is connected to the upper surface of the second terminal 92. Note that the connecting positions of the fusible conductor sheets 50*a* to 50*f*, the first terminal 91, and the second terminal 92 are not limited to this. For example, the first end portions 51 of the fusible conductor sheets 50*a* to 50*f* may all be connected to the upper surface of the first terminal 91, and may all be connected to the lower surface of the first terminal 91. Moreover, the second end portions 52 of the fusible conductor sheets 50*a* to 50*f* may all be connected to the upper surface of the second terminal 92, and may all be connected to the lower surface of the second terminal 92.

Each of the fusible conductor sheets 50*a* to 50*f* may be a stacked body containing a low melting point metal layer and a high melting point metal layer, and may be a single layer. A stacked body containing a low melting point metal layer and a high melting point metal layer may have a structure wherein the periphery of the low melting point metal layer is covered by a high melting point metal layer.

The low melting point metal layer of the stacked body contains Sn. The low melting point metal layer may be solely Sn or may be an Sn alloy. An Sn alloy is an alloy wherein Sn is the principal component. An Sn alloy is an alloy wherein the content of Sn is highest among the metals contained in the alloy. Examples of an Sn alloy include Sn—Bi alloys, In—Sn alloys, and Sn—Ag—Cu alloys. The high melting point metal layer contains Ag or Cu. The high melting point metal layer may be solely Ag, may be solely Cu, may be an Ag alloy, and may be a Cu alloy. An Ag alloy is an alloy wherein the content of Ag is highest among the metals contained in the alloy, and a Cu alloy is an alloy wherein the content of Cu is highest among the metals contained in the alloy. A stacked body may have a two-layer structure of a low melting point metal layer/high melting point metal layer, and may have a multilayer structure of three layers or more containing two or more layers of a high melting point metal layer and one or more layers of a low melting point metal layer, wherein the low melting point metal layer is arranged between the high melting point metal layers.

In the case of a single layer, the layer contains Ag or Cu. The single layer may be solely Ag, may be solely Cu, may be an Ag alloy, and may be a Cu alloy.

Each of the fusible conductor sheets 50*a* to 50*f* may include a through-hole 54 (54*a*, 54*b*, 54*c*) in the fusion portion 53. In the examples illustrated in the figures, there are three through-holes, however, the number is not limited. Having the through-hole 54 makes the cross-sectional area of the fusion portion 53 smaller than the cross-sectional area of the first end portion 51 and the second end portion 52. By having the cross-sectional area of the fusion portion 53 be smaller, when a large current that exceeds a rated value flows to each of the fusible conductor sheets 50*a* to 50*f*, the amount of heat generated in the fusion portion 53 increases, whereby the fusion portion 53 forms a fusion portion and easily fuses. The configuration by which the fusion portion 53 fuses more easily than the first end portion 51 and the second end portion 52 is not limited to a through-hole, and configurations such that narrow a width and partially reduce a thickness are also possible. A notch shape such as a perforation is also acceptable.

Moreover, in each of the fusible conductor sheets 50*a* to 50*f*, the fusion portion 53, which is configured to readily be fused, is readily cut by a protruding portion 20*a* of the shielding member 20.

The thickness of the fusible conductor sheets 50*a* to 50*f* is a thickness that is fused by an overcurrent and that is physically cut by the shielding member 20. The specific thickness depends on the material or number (number of sheets) of the fusible conductor sheets 50*a* to 50*f* and a pressing force (stress) of the pressing means 30, however, for example, in the case that the fusible conductor sheets 50*a* to 50*f* are a copper foil, a range can be set to 0.01 mm to 0.1 mm as a standard. Moreover, in the case that the fusible conductor sheets 50*a* to 50*f* are a foil having Ag plated on a periphery of an alloy whose principal component is Sn, a range can be set to 0.1 mm to 1.0 mm as a standard.

Each of the first insulating members 60Aa to 60Af are made up of a first insulating piece 63*a* and a second insulating piece 63*b* that face each other through a gap (first separation part) 64. The second insulating member 60B is similarly made up of a third insulating piece 66*a* and a fourth insulating piece 66*b* that face each other through a gap (second separation part) 65. In the examples illustrated in the figures, the gaps 64 and 65 of the first insulating members 60Aa to 60Af and the second insulating member 60B are separation parts (first separation part and second separation part) that separate into two members (the first insulating piece 63*a*, the second insulating piece 63*b*, the third insulating piece 66*a*, and the fourth insulating piece 66*b*), but may be openings (first opening and second opening) that permit movement (passage) of the protruding portion 20*a* of the shielding member 20.

The first insulating piece 63*a* and the second insulating piece 63*b* respectively include, on both end sides in the Y direction, a ventilation hole 67 for efficiently releasing an increase in pressure, which accompanies arc discharge generated during cutoff of the fuse element, to a pressing means housing space of the insulating case. In the examples illustrated in the figures, three each of the first insulating piece 63*a* and the second insulating piece 63*b* are respectively included on both end sides in the Y direction, however, the number is not limited.

The increase in pressure generated by the arc discharge passes through the ventilation hole 67 and is efficiently released to the space that houses the pressing means 30 of the insulating case 10 via gaps (not illustrated) of the four corners provided between a pressing means support portion 20*b* and the second holding member 10Bb. Furthermore, as a result, shielding action of the shielding member 20 is carried out smoothly and breakdown of the first insulating members 60Aa to 60Af and the second insulating member 60B is prevented.

The gaps 64 and 65 are positioned facing the fusion portion 53 arranged between the first end portion 51 and the second end portion 52 of the fusible conductor sheets 50*a* to 50*f*. That is, the first insulating members 60Aa to 60Af and the second insulating member 60B are separated at positions facing the fusion portion 53 of the fusible conductor sheets 50*a* to 50*f*.

It is preferable that the first insulating members 60Aa to 60Af and the second insulating member 60B be formed of a material having a tracking resistance index CTI of 500 V or more.

A resin material can be used as a material for the first insulating members 60Aa to 60Af and the second insulating member 60B. Examples of the resin material are the same as the case for the cover 10A and the holding member 10B.

The fuse element stacked body 40 can be manufactured, for example, in the following manner.

Using a jig having positioning recesses corresponding to protrusions provided on the first insulating members 60Aa to 60Af and the second insulating member 60B and a positioning-fixing portion for the first terminal 91 and the second terminal 92, the fusible conductor sheets 50*a* to 50*f* and the first insulating members 60Ab to 60Af are each alternately stacked on the first insulating member 60Aa in the thickness direction, and the second insulating member 60B is arranged on the upper surface of the fusible conductor sheet 50*f*, which is arranged uppermost, to obtain a stacked body.

(Shielding Member)

The shielding member 20 includes the protruding portion 20*a*, which faces the fuse element stacked body 40 side, and the pressing means support portion 20*b*, which includes a recessed portion 20*ba* that houses and supports a lower portion of the pressing means 30.

Downward movement of the shielding member 20 is suppressed by the locking member 70 in a state wherein the pressing force of the pressing means 30 is applied downward. Therefore, when the locking member 70 is heated by heat generated by the heat-generating body 80 and softened at a temperature at or above a softening temperature thereof, the shielding member 20 becomes able to move downward. At this time, the softened locking member 70 is physically cut by the shielding member 20, thermally fused, or receives an action combining physical cutting from the shielding member 20 and thermal fusion depending on the material type, heating conditions, and the like.

When the downward movement suppression by the locking member 70 is disengaged, the shielding member 20 moves downward and physically cuts the fusible conductor sheets 50*a* to 50*f*.

The shielding member 20 has a leading edge 20*aa* of the protruding portion 20*a* that is pointed, formed to readily cut through the fusible conductor sheets 50*a* to 50*f*.

FIG. 6 illustrates a cross-sectional view of the protective element in a state wherein the shielding member 20 has moved through the gaps 64 and 65 in the fuse element stacked body 40, cut through the fusible conductor sheets 50*a*, 50*b*, 50*c*, 50*d*, 50*c*, and 50*f* using the protruding portion 20*a*, and the shielding member is all the way down.

When the shielding member 20 moves down through the gaps 65 and 64 of the fuse element stacked body 40 and cuts the fusible conductor sheets 50*f*, 50*c*, 50*d*, 50*c*, 50*b*, and 50*a* in order using the protruding portion 20*a* of the shielding member 20, the cut surfaces are shielded and insulated from each other by the protruding portion 20*a*, and the current carrying path through each of the fusible conductor sheets is physically cut off in a reliable manner. Thus, arc discharge is quickly eliminated (extinguished).

Moreover, when the shielding member 20 moves through the gaps 65 and 64 of the fuse element stacked body 40 and is all the way down, the pressing means support portion 20*b* of the shielding member 20 presses the fuse element stacked body 40 from the second insulating member 60B, and the fusible conductor sheets and the first insulating members 60Aa to 60Af as well as the second insulating member 60B adhere to each other, and a space where arc discharge can continue is therefore eliminated therebetween, and arc discharge is reliably eliminated.

The thickness (length in the X direction) of the protruding portion 20*a* is smaller than the width of the gaps 64 and 65 of the first insulating members 60Aa to 60Af and the second insulating member 60B in the X direction. According to this configuration, the protruding portion 20*a* can move downward in the Z direction through the gaps 64 and 65.

For example, when the fusible conductor sheets 50*a* to 50*f* are a copper foil, the difference between the thickness of the protruding portion 20*a* and the width of the gaps 64 and 65 in the X direction can be set to 0.05 to 1.0 mm, for example, and is preferably set to 0.2 to 0.4 mm. When 0.05 mm or more, the movement of the protruding portion 20*a* becomes smooth even if the end portion of the fusible conductor sheets 50*a* to 50*f*, when the cut minimum thickness is 0.01 mm, enters the gap between the first insulating members 60Aa to 60Af, the second insulating member 60B, and the protruding portion 20*a* and the arc discharge is eliminated more quickly and reliably. This is because the protruding portion 20*a* is difficult to catch when the difference described above is 0.05 mm or more. Moreover, when the difference is 1.0 mm or less, the gaps 64 and 65 function as a guide for moving the protruding portion 20*a*. Therefore, a positional shift of the protruding portion 20*a* while moving during fusion of the fusible conductor sheets 50*a* to 50*f* is prevented, and arc discharge is more quickly and reliably eliminated. When the fusible conductor sheets 50*a* to 50*f* are a foil having Ag plated on a periphery of an alloy whose principal component is Sn, the difference between the thickness of the protruding portion 20*a* and the width of the gaps 64 and 65 in the X direction can be set to 0.2 to 2.5 mm, for example, and is preferably set to 0.22 to 2.2 mm.

The width (length in the Y direction) of the protruding portion 20*a* is wider than the width of the fusible conductor sheets 50*a* to 50*f* of the fuse element stacked body 40. According to this configuration, the protruding portion 20*a* can cut each of the fusible conductor sheets 50*a* to 50*f*.

The length L of the protruding portion 20*a* in the Z direction has a length such that the leading edge 20*aa* of the protruding portion 20*a* can reach below the first insulating member 60Aa arranged lowermost of the first insulating members 60Aa to 60Af in the Z direction when the protruding portion is all the way down in the Z direction. When below the first insulating member 60Aa arranged lowermost, the protruding portion 20*a* is inserted into an insertion hole 14 formed on an inner bottom surface 13 of the holding member 10Ba.

According to this configuration, the protruding portion 20*a* can cut each of the fusible conductor sheets 50*a* to 50*f*.

(Pressing Means)

The pressing means 30 is housed in the recessed portion 20*ba* of the shielding member 20 while the shielding member 20 is pressed downward in the Z direction.

For example, known means capable of imparting an elastic force such as a spring, rubber, and the like can be used as the pressing means 30.

A spring is used as the pressing means 30 in the protective element 100. The spring (pressing means) 30 is held in a compressed state in the recessed portion 20*ba* of the shielding member 20.

A known material can be used for the material of the spring used as the pressing means 30.

A cylindrical or conical spring can be used as the spring used as the pressing means 30. Contraction length can be shortened when using a conical spring, which allows for the suppression of a pressing height and miniaturization of the protective element. Moreover, conical springs can be stacked in a plurality to increase stress.

In the case of using a conical spring as the pressing means 30, the side having a smaller outer diameter may be arranged facing the fusion portion (cut portion) 53 side of the fusible conductor sheets 50*a* to 50*f*, respectively, and the side having the larger outer diameter may be arranged facing the fusion portion 53 side of the fusible conductor sheets 50*a* to 50*f*, respectively.

When using a conical spring as the pressing means 30, by arranging the side having the smaller outer diameter facing the fusion portion (cut portion) 53 side of the fusible conductor sheets 50*a* to 50*f*, respectively, for example, when the spring is formed of a conductive material such as a metal, continued arc discharge generated during cutting of the fusion portions 53 respective to the fusible conductor sheets 50*a* to 50*f* can be more effectively suppressed. This is because a distance between the location of arc discharge generation and the conductive material forming the spring is easily secured.

Moreover, in the case of using a conical spring as the pressing means 30 wherein the side having the larger outer diameter is arranged facing the fusion portion 53 side of the fusible conductor sheets 50*a* to 50*f*, respectively, an elastic force can be uniformly imparted from the pressing means 30 by the shielding member 20, and is preferable.

(Locking Member)

The locking member 70 bridges the gap 65 of the second insulating member 60B and suppresses movement of the shielding member 20.

The protective element 100 is provided with three locking members 70 (70A, 70B, 70C), but the present invention is not limited to three locking members.

The locking member 70A is mounted in a groove 60Ba1 and a groove 60Ba2 of the second insulating member 60B, the locking member 70B is mounted in a groove 60Bb1 and a groove 60Bb2 of the second insulating member 60B, and the locking member 70C is mounted in a groove 60Bc1 and a groove 60Bc2 of the second insulating member 60B.

Figure 12:
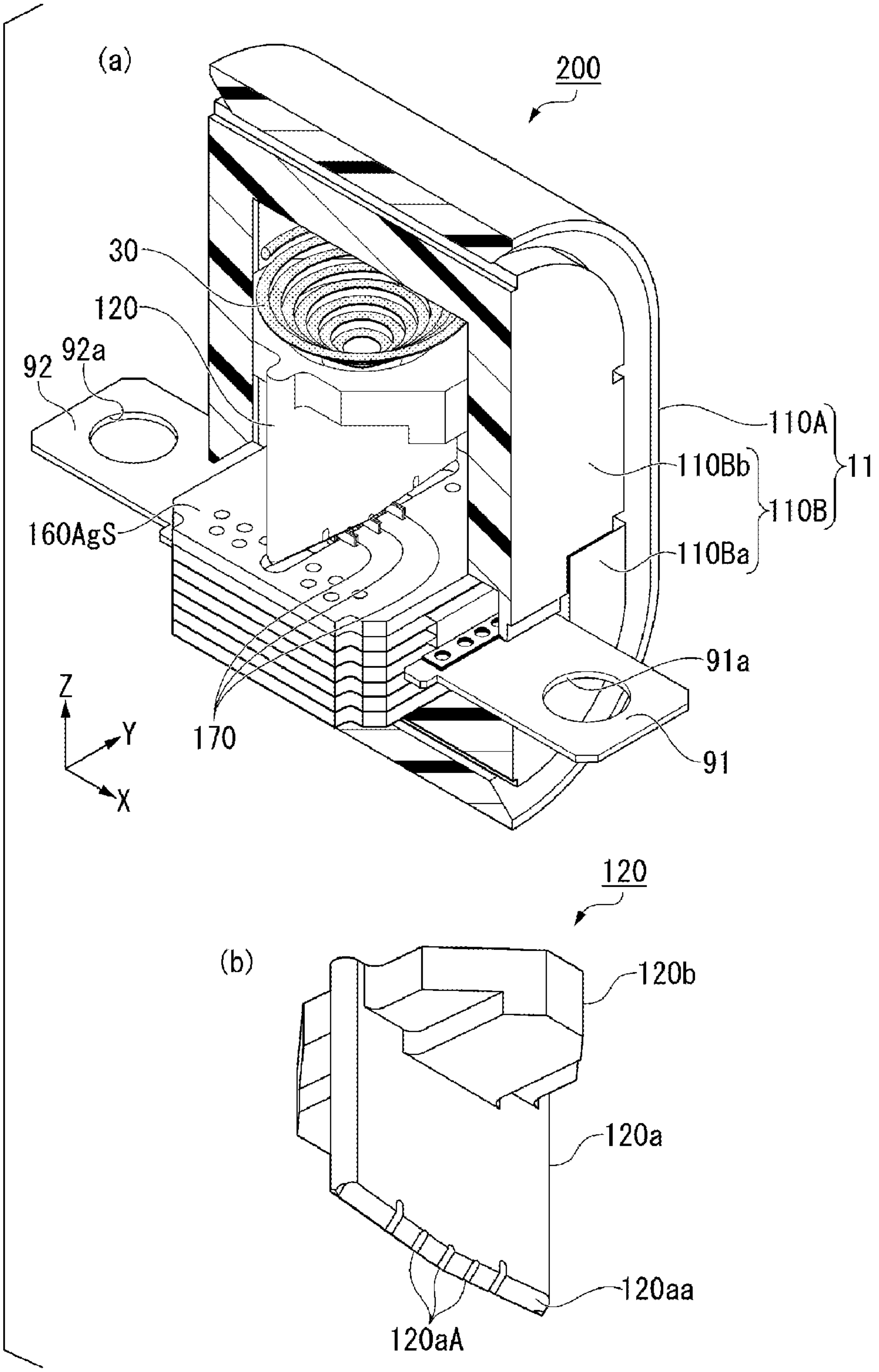
FIG. 12 is a partial perspective view schematically illustrated for viewing the interior of the protective element according to the second embodiment, wherein (b) is a lower perspective view of the shielding member.

Moreover, there is a groove corresponding to the shape and position of the locking member in the leading edge 20*aa* of the protruding portion 20*a* of the shielding member 20 (see FIG. 12(*b*)), and this groove stably holds so as to interpose the locking member.

The three locking members 70A, 70B, and 70C have the same shape. A description of the shape of the locking member 70A is given using the figures, wherein the locking member 70A has a support portion 70Aa that is mounted on and supported by a groove formed in the second insulating member 60B, and a projecting portion 70Ab that extends downward from the support portion and has a leading edge 70Aba that is proximal to or in contact with the uppermost fusible conductor sheet 50*f*. Among the locking members 70, all of the locking members have the same shape, but different shapes may be included.

Heat-generating bodies 80A and 80B are mounted on the locking members 70A, 70B, and 70C. When a current is carried to the heat-generating bodies 80A and 80B, the heat-generating bodies 80A and 80B generate heat and transmit heat to the locking members 70, and the locking members 70 rise in temperature and soften at a temperature at or above the softening temperature. Here, the softening temperature means a temperature or temperature range where a solid phase and a liquid phase mix or coexist. When the temperature of the locking members 70 is at or above the softening temperature, the locking members soften enough to deform due to external forces.

The softened locking members 70 are easily physically cut by the protruding portion 20*a* of the shielding member 20 pressed by the pressing force of the pressing means 30. When the locking members 70 are cut, the protruding portion 20*a* of the shielding member 20 is inserted downward in the Z direction through the gaps 65 and 64.

When the protruding portion 20*a* is inserted downward in the Z direction through the gaps 65 and 64, the protruding portion 20*a* plunges on while cutting the fusible conductor sheets until reaching the lowest position. Thus, the protruding portion 20*a* shields the fusible conductor sheets 50*a* to 50*f* on the first terminal 91 side and the second terminal 92 side at the fusion portions 53 thereof. Thus, arc discharge generated when the fusible conductor sheets 50*a* to 50*f* are cut can be quickly and reliably eliminated.

The fusible conductor sheet 50*f* is heated via the locking members 70 by the heat generation of the heat-generating bodies 80A and 80B, and the other fusible conductor sheets are also heated, so the fusible conductor sheets 50*a* to 50*f* are easily physically cut. Moreover, the fusible conductor sheet 50*f* can be thermally fused depending on the magnitude of heat generation of the heat-generating bodies 80A and 80B. In this case, the protruding portion 20*a* plunges on as-is until reaching the lowest position.

In the locking members 70, the projecting portion 70Ab is in contact with the fusible conductor sheet 50*f*. Therefore, when an overcurrent that exceeds the rated current flows through the fusible conductor sheet, the locking members 70 in contact with the fusible conductor sheet 50*f* transfer heat, the temperature thereof rises, and softening occurs at a temperature at or above the softening temperature.

Moreover, when a large overcurrent flows and the fusible conductor sheet 50*f* is fused instantly, the generated arc discharge also flows to the locking members 70, and the locking members 70 soften at a temperature at or above the softening temperature.

The softened locking members 70 are easily physically cut by the protruding portion 20*a* of the shielding member 20 pressed by the pressing force of the pressing means 30. When the locking members 70 are cut, the protruding portion 20*a* of the shielding member 20 is inserted downward in the Z direction through the gaps 65 and 64.

In this case, an overcurrent that exceeds the rated current flows, the fusible conductor sheet is thermally fused, and the protruding portion 20*a* is inserted downward in the Z direction as-is through the gaps 65 and 64. At this time, the protruding portion 20*a* shields the fusible conductor sheets 50*a* to 50*f* on the first terminal 91 side and the second terminal 92 side at the fusion portions thereof. Thus, arc discharge generated when the fusible conductor sheets 50*a* to 50*f* are cut can be quickly and reliably eliminated.

Even if the fusible conductor sheets are not yet thermally fused, when the protruding portion 20*a* is inserted downward in the Z direction through the gaps 65 and 64, the protruding portion 20*a* plunges on while cutting the fusible conductor sheets until reaching the lowest position. Thus, the protruding portion 20*a* shields the fusible conductor sheets 50*a* to 50*f* on the first terminal 91 side and the second terminal 92 side at the fusion portions thereof. Thus, arc discharge generated when the fusible conductor sheets 50*a* to 50*f* are cut off can be quickly and reliably eliminated.

Figure 7:
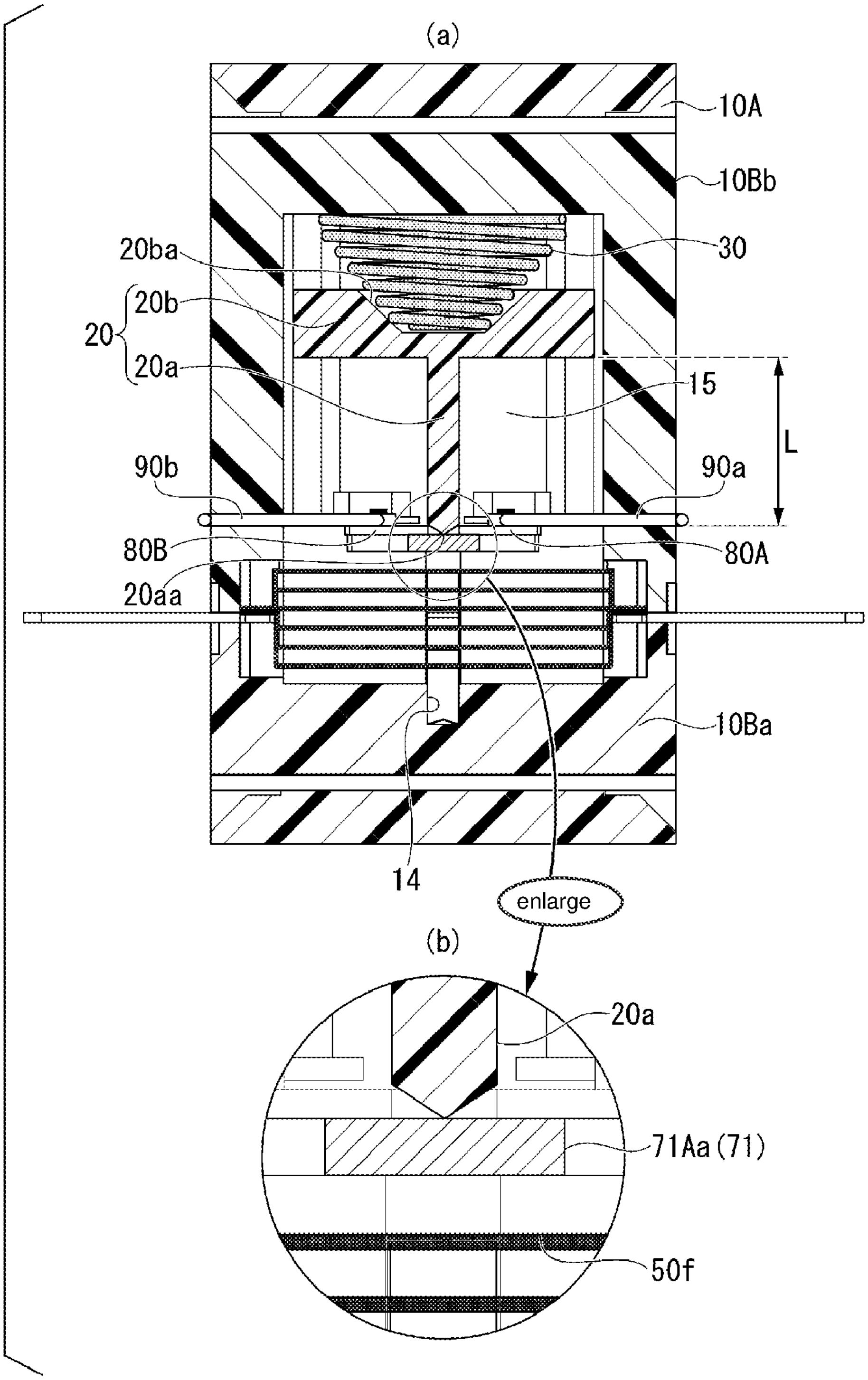
FIG. 7(*a*) is a cross-sectional view of the protective element having a modified example of the locking member, and (b) is an enlarged view of the vicinity of the locking member.

FIG. 7(*a*) illustrates a protective element having a locking member 71, which is a modified example of the locking member 70. FIG. 7(*b*) is an enlarged view of the vicinity of the locking member 71.

The locking member 71 has only the support portion 71Aa that is mounted on and supported by the groove formed in the second insulating member 60B, and is configured not having a projecting portion that contacts the fusible conductor sheet 50*f*.

Having no portion in contact with the fusible conductor sheet 50*f*, the locking member 71 is not softened even if an overcurrent that exceeds the rated current flows through the fusible conductor sheet, and is softened only by the heat-generating body 80. However, in a case where arc discharge accompanying a high voltage is generated, the arc discharge reaches the locking member 71 and fuses the locking member 71, and the protruding portion 20*a* shields the fusible conductor sheets 50*a* to 50*f* on the first terminal 91 side and the second terminal 92 side at the fusion portions thereof.

The material of the locking members 70 and 71 can be the same as that of the fusible conductor sheets, but in order to quickly soften due to energization of the heat-generating body 80, it is preferable that the stacked body contains a low melting point metal layer and a high melting point metal layer. For example, a material having Ag, which has a melting point of 962° C., plated on a periphery of an alloy whose principal component is Sn and has a melting point of 217° C. can be used.

(Heat-Generating Body)

The heat-generating body 80 is mounted so as to contact the upper surface of the locking members 70. Heat is generated by carrying a current to the heat-generating body 80, the heat of which heats, softens, and melts the locking members 70.

Melting of the locking members 70 causes the shielding member 20, to which a pressing force is applied downward in the Z direction by the pressing means 30, to be inserted into the gaps of the fuse element stacked body 40, cutting the fusible conductor sheet 50 and shielding the fuse element stacked body 40 on the first terminal 91 side and the second terminal 92 side.

The protective element 100 is provided with two heat-generating bodies 80 (80A, 80B), but the present invention is not limited to two heat-generating bodies.

Figure 8:
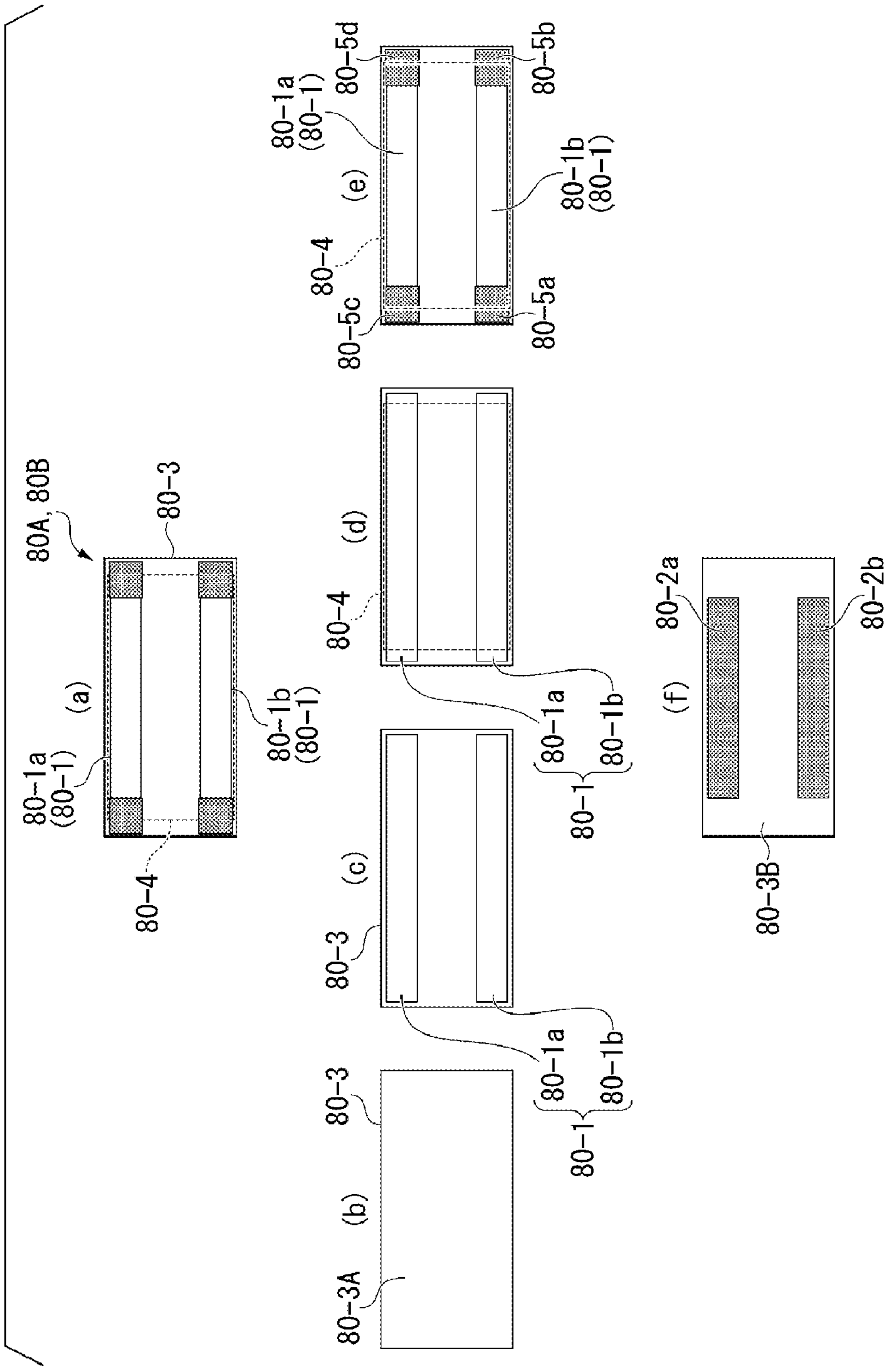
FIG. 8 illustrates one example of a structure of a heat-generating body, wherein (a) is a top surface plan view, (b) is a top surface plan view of an insulating substrate before printing, (c) is a top surface plan view after resistance layer printing, (d) is a top surface plan view after insulating layer printing, (e) is a top surface plan view after electrode layer printing, and (f) is a bottom surface plan view.

A schematic diagram of the heat-generating body 80 is illustrated in FIG. 8. FIG. 8(*a*) is a plan view of the front surface (surface on the pressing means side 30) of the heat-generating body 80, FIG. 8(*b*) is a plan view of an insulating substrate, and FIGS. 8(*c*) to (*c*) are each transparent plan views illustrated such that the three layers on the front side of the insulating substrate are stacked in order, with the bottom layer also being visible. Being plan views, FIG. 8(*c*) is in a state wherein a resistance layer is stacked on the insulating substrate, (d) is in a state wherein an insulating layer is further stacked on that in (c), and (e) is in a state wherein an electrode layer is further stacked on that in (d). FIG. 8(*f*) is a plan view of a rear surface (surface on the fuse element stacked body 40 side) of the heat-generating body 80.

Each of the heat-generating bodies 80A and 80B has: two resistance layers 80-1 (80-1*a*, 80-1*b*) arranged in parallel and separated from each other on a front surface 80-3A (surface on the pressing means 30 side) of an insulating substrate 80-3; an insulating layer 80-4 covering the resistance layer 80-1; a heat-generating body electrode 80-5*a* and a heat-generating body electrode 80-5*b* formed on the insulating substrate 80-3 and electrically connected to both ends of the resistance layer 80-1*a*; a heat-generating body electrode 80-5*c* and a heat-generating body electrode 80-5*d* electrically connected to both ends of the resistance layer 80-1*b*; and an electrode layer 80-2 (80-2*a*, 80-2*b*) formed on a rear surface 80-3B (surface on the fuse element stacked body 40 side) of the insulating substrate 80-3. Two resistance layers are provided for each of the heat-generating bodies 80A and 80B, and these are fail-safe designs that take into account the possibility of being rotated 180 degrees and mounted, and two are not essential.

The resistance layer 80-1 is made up of a conductive material that generates heat when energized, for example, Nichrome, W, Mo, Ru, or a material containing these. The resistance layer 80-1 is formed by mixing an alloy of these, a composition, or a compound powder with a resin binder or the like to form a paste, which is formed in a pattern on the insulating substrate 80-3 using a screen printing technique and fired, or the like. The insulating substrate 80-3 is, for example, an insulating substrate such as alumina, glass ceramic, mullite, and zirconia. The insulating layer 80-4 is provided to protect the resistance layer 80-1. For example, an insulating material such as a ceramic or glass can be used as the material of the insulating layer 80-4. The insulating layer 80-4 can be formed by a method of coating and firing a paste of an insulating material.

The heat-generating body electrodes 80-5*a* to *d* on the front surface of each of the heat-generating bodies 80A and 80B and the electrode layers 80-2*a* and *b* on the rear surface are electrically insulated by the insulating substrate 80-3.

The heat-generating bodies 80A and 80B are not limited to those illustrated in FIG. 8, and a known heat-generating body may be used.

When a need arises to cut off a current carrying path due to, for example, an abnormality occurring in an external circuit serving as the current carrying path of the protective element 100 or the like, the heat-generating bodies 80A and 80B are energized and heated by a current control element provided on the external circuit.

(Power Supply Member)

Figure 9:
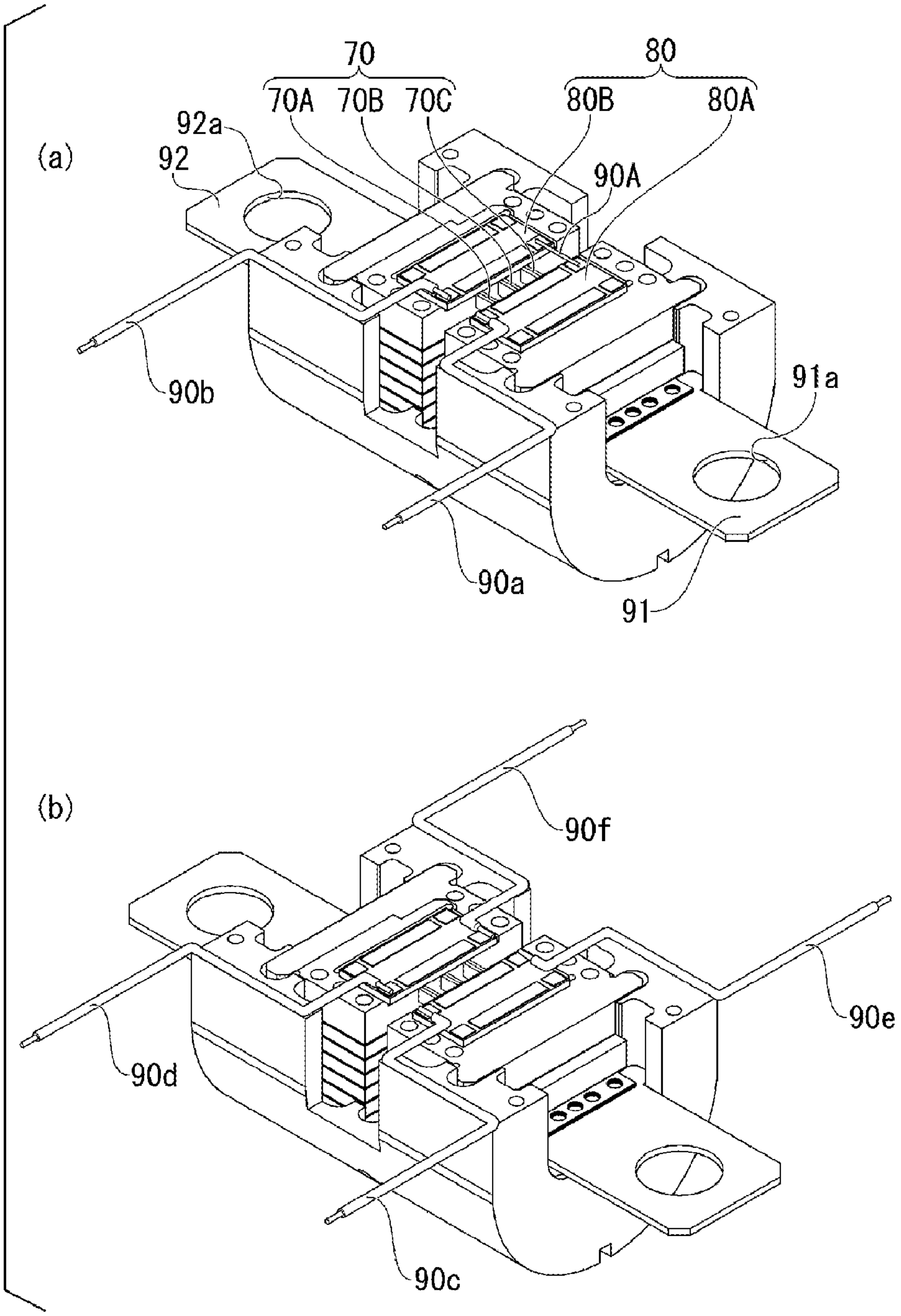
FIG. 9 is a perspective view of a protective element for describing a method for extracting a power supply member that supplies power to the heat-generating body, wherein (a) is a case wherein two heat-generating bodies are connected in series, and (b) is a case wherein two heat-generating bodies are connected in parallel.

FIG. 9 is a perspective view of a protective element for describing a method for extracting a power supply member that supplies power to the heat-generating bodies 80A and 80B, wherein (a) is a case wherein the heat-generating bodies 80A and 80B are connected in series, and (b) is a case wherein the heat-generating bodies 80A and 80B are connected in parallel.

In FIG. 9(*a*), the power supply member 90*a* is connected to the heat-generating body electrode 80-5*c* of the heat-generating body 80A (see FIG. 8), the power supply member 90*b* is connected to the heat-generating body electrode 80-5*a* of the heat-generating body 80B (see FIG. 8), and the power supply member 90A is connected to the heat-generating body electrode 80-5*d* of the heat-generating body 80A (see FIG. 8) and the heat-generating body electrode 80-5*b* of the heat-generating body 80B (see FIG. 8). Moreover, the electrode layer 80-2 of the heat-generating body 80A is connected to the electrode layer 80-2 of the heat-generating body 80B through the locking members 70 (70A, 70B, 70C). In this configuration, power is supplied by the path: "the power supply member 90*a*—the heat-generating body electrode 80-5*c* of the heat-generating body 80A—the resistance layer 80-1*a* of the heat-generating body 80A—the heat-generating body electrode 80-5*d* of the heat-generating body 80A—the power supply member 90A—the heat-generating body electrode 80-5*b* of the heat-generating body 80B—the resistance layer 80-1*b* of the heat-generating body 80B—the heat-generating body electrode 80-5*a* of the heat-generating body 80B—the power supply member 90*b*" to heat the heat-generating bodies 80A and 80B. The locking members 70 (70A, 70B, 70C) are melted by this generation of heat, and the shielding member 20 is inserted into the gaps 64 and 65 of the fuse element stacked body 40. The shielding member 20 is inserted into the gaps 64 and 65 of the fuse element stacked body 40, whereby the power supply member 90A is cut, the power supply to the heat-generating bodies 80A and 80B is cut off, and the heat generation of the heat-generating bodies 80A and 80B stops.

In FIG. 9(*b*), a power supply member 90*c* is connected to the heat-generating body electrode 80-5*c* of the heat-generating body 80A, and a power supply member 90*e* is connected to the heat-generating body electrode 80-5*d* of the heat-generating body 80A. Moreover, a power supply member 90*d* is connected to the heat-generating body electrode 80-5*a* of the heat-generating body 80B, and a power supply member 90*f* is connected to the heat-generating body electrode 80-5*b* (see FIG. 8). In this configuration, a first path: "the power supply member 90*c*—the heat-generating body electrode 80-5*c* of the heat-generating body 80A—the resistance layer 80-1*a* of the heat-generating body 80A—the heat-generating body electrode 80-5*d* of the heat-generating body 80A—the power supply member 90*c*", and a second path: "the power supply member 90*d*—the heat-generating body electrode 80-5*a* of the heat-generating body 80B—the resistance layer 80-1*b* of the heat-generating body 80B—the heat-generating body electrode 80-5*b* of the heat-generating body 80B—the power supply member 90*f*" are configured in parallel. Power is supplied by the first path and the second path, heating the heat-generating bodies 80A and 80B. The locking members 70 (70A, 70B, 70C) are melted by this generation of heat, and the shielding member 20 is inserted into the gaps 64 and 65 of the fuse element stacked body 40. In this configuration, the shielding member 20 is inserted into the gaps 64 and 65 of the fuse element stacked body 40, whereby the power supply to the heat-generating bodies 80A and 80B is not cut off and the heat generation of the heat-generating bodies 80A and 80B continues. Therefore, the heat generation of the heat-generating bodies 80A and 80B of the protective element 100 after cutting off can be stopped by appropriately stopping energization of current control elements by separate system control (a timer or the like).

(First Terminal and Second Terminal)

One end portion of the first terminal 91 is connected to the first end portion 51 of the fusible conductor sheets 50*a* to 50*f*, and the other end portion is exposed to the outside of the insulating case 10. Moreover, one end portion of the second terminal 92 is connected to the second end portion 52 of the fusible conductor sheets 50*a* to 50*f*, and the other end portion is exposed to the outside of the insulating case 10.

The first terminal 91 and the second terminal 92 may be substantially the same shape or may have different shapes. The thickness of the first terminal 91 and the second terminal 92 is not particularly limited, but may be within a range of, for example, 0.3 mm or more and 1.0 mm or less. The thickness of the first terminal 91 and the thickness of the second terminal 92 may be the same or may be different.

The first terminal 91 is provided with an external terminal hole 91*a*. Moreover, the second terminal 92 is provided with an external terminal hole 92*a*. One of the external terminal hole 91*a* and the external terminal hole 92*a* is used for connecting to the power source side, and the other is used for connecting to the load side. Alternatively, the external terminal hole 91*a* and the external terminal hole 92*a* may be used to be connected to the internal current carrying path of the load. The external terminal hole 91*a* and the external terminal hole 92*a* can be formed into a through-hole that is substantially circular in plan view.

For example, a terminal made up of copper, brass, nickel, or the like can be used as the first terminal 91 and the second terminal 92. As materials for the first terminal 91 and the second terminal 92, it is preferable to use brass from the perspective of strengthening rigidity, and it is preferable to use copper from the perspective of reducing electrical resistance. The first terminal 91 and the second terminal 92 may be made up of the same material or may be made up of different materials.

(Manufacturing Method of Protective Element)

The protective element 100 of the present embodiment can be manufactured in the following manner.

First, the fuse element stacked body 40, first terminal 91, and the second terminal 92 positioned by a jig are prepared. Furthermore, the first end portion 51 of each of the fusible conductor sheets 50*a* to 50*f* of the fuse element stacked body 40 and the first terminal 91 are connected by soldering.

Moreover, the second end portions 52 and the second terminal 92 are connected by soldering. Known solder materials can be used for soldering, and from the perspective of resistivity, melting point, and being lead-free for the environment, it is preferable to use solder materials having Sn as the principal component thereof. The connection between the first end portion 51 of the fusible conductor sheets 50*a* to 50*f* and the first terminal 91 and the connection between the second end portion 52 of the fusible conductor sheets 50*a* to 50*f* and the second terminal 92 are not limited to soldering and may use a known joining method such as joining by welding.

Next, the locking members 70A, 70B, and 70C are prepared. The locking members 70A, 70B, and 70C are respectively arranged in the groove 60Ba1 and the groove 60Ba2, the groove 60Bb1 and the groove 60Bb2, and the groove 60Bc1 and the groove 60Bc2 of the second insulating member 60B illustrated in FIG. 3.

Furthermore, a jig of the same shape as the second insulating member 60B may be used.

Next, solder paste and the heat-generating bodies 80A and 80B illustrated in FIG. 8(*a*) and FIG. 8(*b*) are prepared. Furthermore, after applying an appropriate amount of the solder paste to the connecting sites of the locking members 70A, 70B, and 70C and the heat-generating bodies 80A and 80B, the heat-generating bodies 80A and 80B are arranged in predetermined positions of the second insulating member 60B as illustrated in FIG. 9(*a*). The rear sides of the heat-generating bodies 80A and 80B are mounted on the locking members 70A, 70B, and 70C. The locking members 70A, 70B, and 70C and the heat-generating bodies 80A and 80B are connected by soldering by heating in an oven, a reflow furnace, or the like.

Next, the power supply members 90*a*, 90*b*, and 90A are prepared. The power supply member 90*a* is arranged on the power supply member mounting surface 12, and the power supply member 90*a* is connected by soldering to the heat-generating body electrode 80-5*c* of the heat-generating body 80A. Moreover, the power supply member 90*b* is arranged on the power supply member mounting surface 12, and the power supply member 90*b* is connected by soldering to the heat-generating body electrode 80-5*a* of the heat-generating body 80B. Moreover, the power supply member 90A is connected by soldering to the heat-generating body electrode 80-5*d* of the heat-generating body 80A and the heat-generating body electrode 80-5*b* of the heat-generating body 80B. The power supply members 90*a*, 90*b*, and 90A and the heat-generating bodies 80A and 80B may be connected by joining by welding, and a known joining method can be used.

Next, the second holding member 10Bb, the shielding member 20, and the pressing means 30 are prepared. Furthermore, the pressing means 30 are arranged in the recessed portion 20*ba* of the shielding member 20 and housed in the second holding member 10Bb.

Next, while fitting the locking members 70A, 70B, and 70C into the grooves provided in the leading edge 20*aa* of the shielding member 20 and compressing the pressing means 30, the holding member 10B is formed by engaging four protrusions (not illustrated) formed in corresponding locations of the second holding member 10Bb with recessed portions 17, two of which are formed in the first end portion 10Baa and the second end portion 10Bab of the first holding member 10Ba respectively.

Next, the cover 10A is prepared. Furthermore, the holding member 10B is inserted into the housing portion 22 of the cover 10A. Next, an adhesive is injected into a terminal adhesive injection port 16 of the holding member 10B to fill in the gap between the terminal mounting surface 111 and the first terminal 91 and the second terminal 92. Moreover, an adhesive is injected into the inclined surface 21 serving as a case adhesive injection port at the elliptical side surface of the cover 10A to adhere the cover 10A and the holding member 10B. For example, an adhesive containing a thermosetting resin can be used as the adhesive. Thus, the insulating case 10 is formed having the inside of the cover 10A sealed.

The protective element 100 of the present embodiment is obtained according to the above steps.

In the protective element 100 of the present embodiment, in the case that an overcurrent that exceeds the rated current flows to the fuse element 50 (the plurality of fusible conductor sheets 50*a* to 50*f*), the fuse element 50 is thermally fused and the current path is cut off, in addition to which, current is carried to the heat-generating bodies 80, the locking member 70 suppressing the movement of the shielding member 20 melts, and the shielding member 20 is moved by the pressing means 30, which makes it possible to physically cut the fuse element 50 and cut off the current path.

In the protective element 100 of the present embodiment, because the movement of the shielding member 20 to which a pressing force is applied by the pressing means 30 is suppressed by the locking members 70, a cutting pressing force is not applied by the pressing means 30 and the shielding member 20 to the fuse element 50 (the plurality of fusible conductor sheets 50*a* to 50*f*) other than when the current path is cut off. Therefore, deterioration of the fuse element 50 over time is suppressed, and when there is no need to cut off the current path, disconnection stemming from the state wherein the pressing force is applied when the temperature of the fuse element 50 rises can be prevented.

In the protective element 100 of the present embodiment, the fuse element stacked body 40 includes the plurality of fusible conductor sheets 50*a* to 50*f* arranged in parallel in the thickness direction, and each of the fusible conductor sheets 50*a* to 50*f* is insulated by being proximal to or in contact with (adhered to) the first insulating members 60Aa to 60Af and the second insulating member 60B arranged therebetween. Therefore, the current value flowing through each of the fusible conductor sheets 50*a* to 50*f* lessens and the space surrounding the fusible conductor sheets 50*a* to 50*f* becomes extremely narrow, making the scale of arc discharge generated by fusion more likely to be low. That is, when the fusion space is narrow, the gas in the space is reduced, the amount of "plasma generated by ionization of the gas in the space", which is the path through which the current flows during arc discharge, is also reduced, and arc discharge is more easily extinguished early. Therefore, according to the protective element 100 of the present embodiment, the size of the insulating case 10 can be made smaller and lighter.

In the protective element 100 of the present embodiment, when the first insulating member 60Aa is arranged between the fusible conductor sheet 50*a* arranged on the lowermost of the fusible conductor sheets 50*a* to 50*f* and the first holding member 10Ba of the insulating case 10, and the second insulating member 60B is arranged between the fusible conductor sheet 50*f* arranged on the uppermost of the fusible conductor sheets 50*a* to 50*f* and the second holding member 10Bb of the insulating case 10, the fusible conductor sheets 50*a* and 50*f* do not make direct contact with the first holding member 10Ba and the second holding member 10Bb, so carbides forming a conduction path on an inner surface of the insulating case 10 due to arc discharge form less readily, and in turn, leak current occurs less readily even if the size of the insulating case 10 is reduced.

In the protective element 100 of the present embodiment, when the first insulating members 60Aa to 60Af and the second insulating member 60B are separated at a position opposing the fusion portion 53 of the first end portion 51 and the second end portion 52 of the fusible conductor sheets 50*a* to 50*f*, continuous adhesion of melted scattered material on the surfaces of the first insulating members 60Aa to 60Af and the second insulating member 60B can be suppressed when the fusible conductor sheets 50*a* to 50*f* are fused at the fusion portion 53. Therefore, arc discharge caused by fusion of the fusible conductor sheets 50*a* to 50*f* can be extinguished early.

In the protective element 100 of the present embodiment, when at least one of the first insulating members 60Aa to 60AF, the second insulating member 60B, the shielding member 20, the cover 10A of the insulating case 10, and the holding member 10B is formed of a material having a tracking resistance index CTI of 500 V or greater, carbides forming a conduction path on a surface of these component due to arc discharge form less readily, and in turn, leak current occurs less readily even if the size of the insulating case 10 is reduced.

In the protective element 100 of the present embodiment, when at least one of the first insulating members 60Aa to 60Af, the second insulating member 60B, the shielding member 20, the cover 10A of the insulating case 10, and the holding member 10B is formed of a polyamide-based resin or a fluorine-based resin, the polyamide-based resin or the fluorine-based resin has excellent insulating properties and tracking resistance, making it easier to reduce both size and weight.

In the protective element 100 of the present embodiment, each of the fusible conductor sheets 50*a* to 50*f* is a stacked body containing a low melting point metal layer and a high melting point metal layer and when the low melting point metal layer contains Sn and the high melting point metal layer contains Ag or Cu, melting of the low melting point metal layer causes the high melting point metal to be dissolved by Sn, and therefore, the fusing temperature of the fusible conductor sheets 50*a* to 50*f* is reduced. Furthermore, because Ag and Cu have higher physical strength than Sn, the physical strength of the fusible conductor sheets 50*a* to 50*f*, which are obtained by laminating a high melting point metal layer on a low melting point metal layer, becomes higher than the physical strength of the low melting point metal layer alone. Additionally, Ag and Cu have lower electrical resistivity than Sn, and the electrical resistance value of the fusible conductor sheets 50*a* to 50*f*, which are obtained by laminating a high melting point metal layer on a low melting point metal layer, becomes lower than the electrical resistance value of the low melting point metal layer alone. That is, the fuse element can handle a larger current.

In the protective element 100 of the present embodiment, when each of the fusible conductor sheets 50*a* to 50*f* is a stacked body having two or more high melting point metal layers and one or more low melting point metal layers, and the low melting point metal layer is arranged between the high melting point metal layers, the strength of the fusible conductor sheets 50*a* to 50*f* increases due to having the high melting point metal layers on the outer sides. In particular, when connecting the first end portion 51 of the fusible conductor sheets 50*a* to 50*f* and the first terminal 91 as well as the second end portion 52 and the second terminal 92 by soldering, deformation of the fusible conductor sheets 50*a* to 50*f* due to heating during soldering occurs less readily.

In the protective element 100 of the present embodiment, when each of the fusible conductor sheets 50*a* to 50*f* is a single layer containing silver or copper, the electrical resistivity is likely to be lower than when these are a stacked body having high melting point metal layers and a low melting point metal layer. Therefore, the thickness of the fusible conductor sheets 50*a* to 50*f* made up of a single layer containing silver or copper can be reduced while having the same area and the same electrical resistance as the fusible conductor sheets 50*a* to 50*f* made up of a stacked body having high melting point metal layers and a low melting point metal layer. When the thickness of the fusible conductor sheets 50*a* to 50*f* is thin, the amount of melted scattered material when the fusible conductor sheets 50*a* to 50*f* are fused decreases in proportion to the thickness, and the insulation resistance after cutting off increases.

In the protective element 100 of the present embodiment, each of the fusible conductor sheets 50*a* to 50*f* has the through hole 54 provided in the fusion portion 53 and has a fusion portion configured so a cross-sectional area of the fusion portion 53 in the current carrying direction is smaller than a cross-sectional area of the first end portion 51 and the second end portion 52 in the current carrying direction, so the site where fusion occurs when a current that exceeds a rated value flows in a current path is stabilized. Note that although in the protective element 100 of the present embodiment the through hole 54 is provided in the fusion portion 53, the method for reducing the cross-sectional area of the fusion portion 53 is not particularly limited. For example, the cross-sectional area of the fusion portion 53 may be reduced by cutting off both end portions of the fusion portion 53 in a concave shape or by partially reducing the thickness.

MODIFIED EXAMPLES

Figure 10:
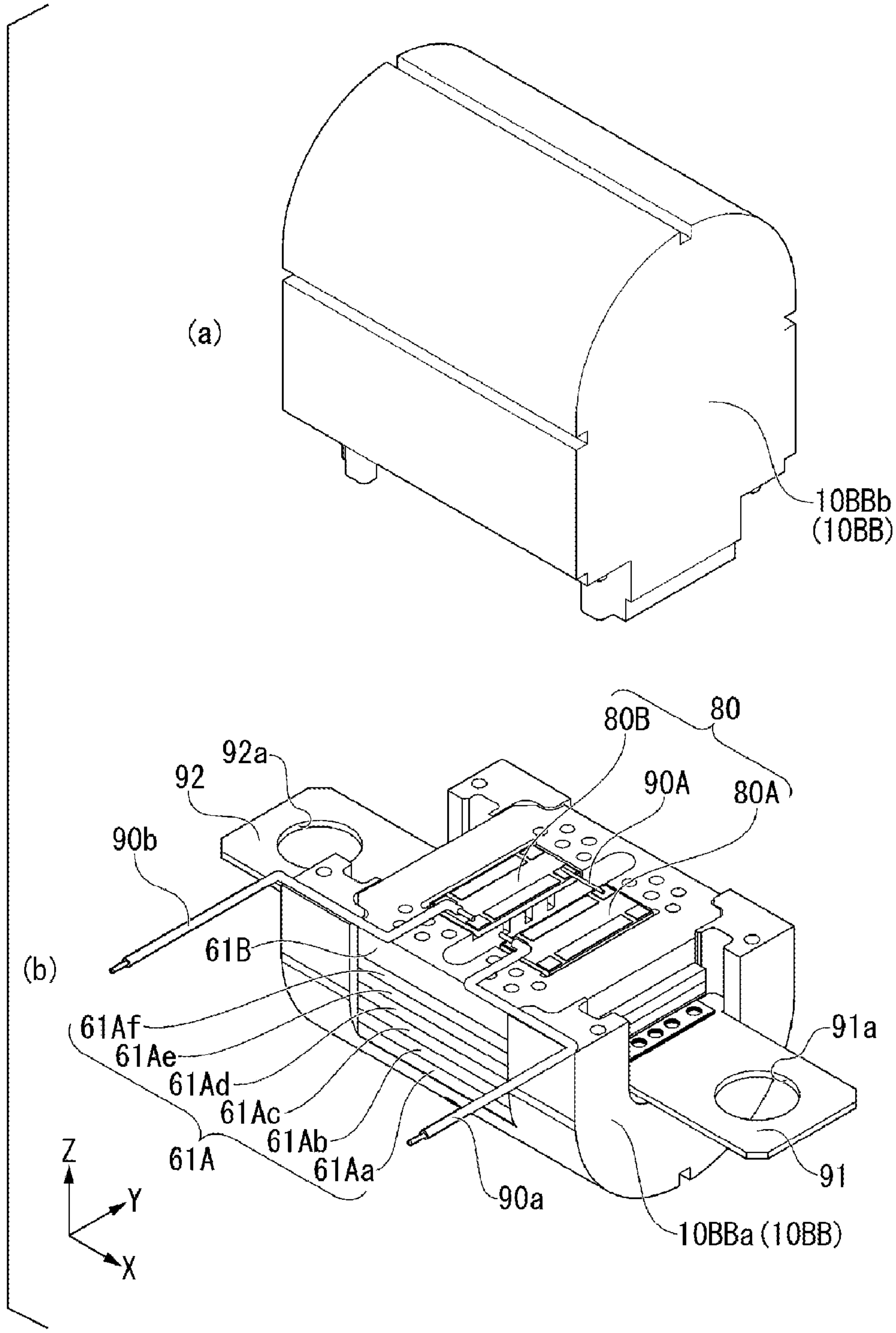
FIG. 10 is a schematic diagram of a modified example of the first embodiment, wherein (a) is a perspective view of a holding member 10BB that is a modified example of a holding member 10B, and (b) is a perspective view of the holding member 10BB that is a modified example of the holding member 10B as well as a first insulating member 61A and a second insulating member 61B that are modified examples of a first insulating member 60A and a second insulating member 60B.
Figure 11:
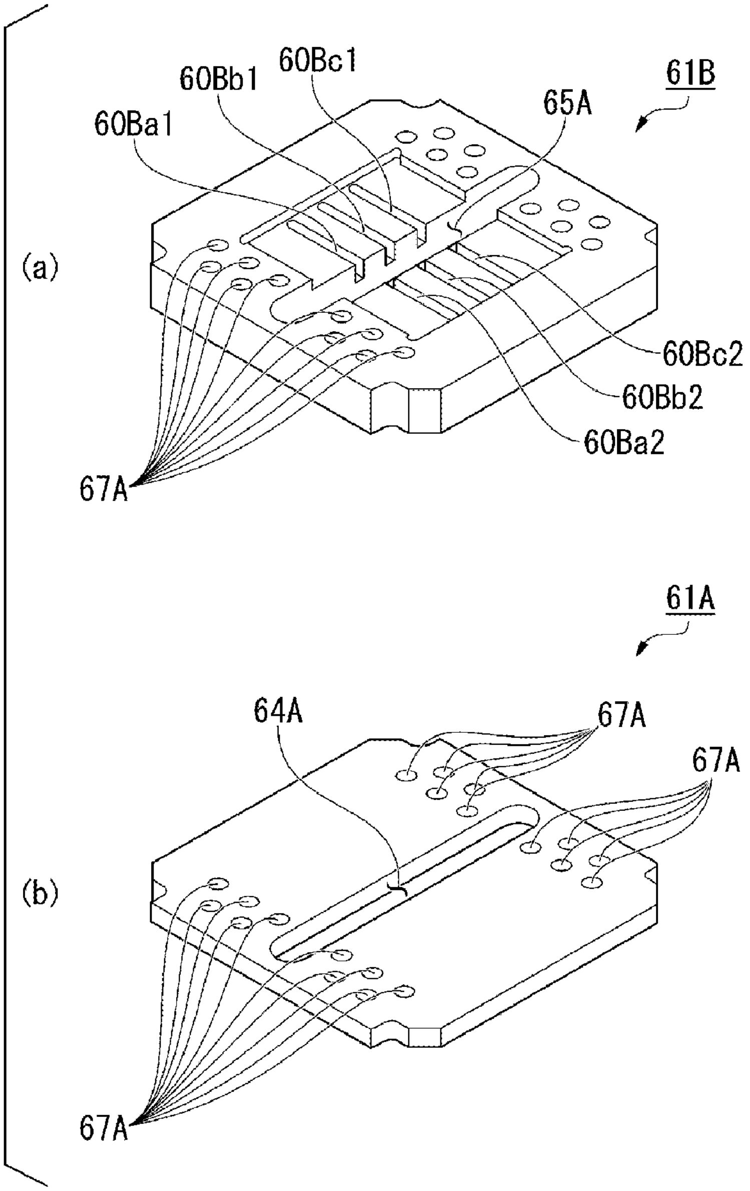
FIG. 11(*a*) is a perspective view of the second insulating member 61B that is a modified example, and (b) is a perspective view of the first insulating member 61A.

FIG. 10 is a schematic diagram of a modified example of the first embodiment, wherein (a) is a perspective view of the holding member 10BB that is a modified example of the holding member 10B, and (b) is a perspective view of a configuration wherein the first insulating member 61A and the second insulating member 61B, which are modified examples of the first insulating member 60A and the second insulating member 60B, include an opening that permits movement (passage) of the protruding portion 20*a* of the shielding member 20. FIG. 11(*a*) illustrates a schematic perspective view of the second insulating member, and (b) illustrates a schematic perspective view of the first insulating member. Note that because the six first insulating members have the same shape, the first insulating member illustrated in FIG. 11(*b*) illustrates the common configuration thereof.

Note that the fuse element stacked body in this modified example has a similar configuration as that illustrated in FIG. 4 other than the first insulating member. Therefore, in the description below, members in common with those illustrated in FIG. 4 are described using the same reference numerals.

Each of the first insulating members 61Aa to 61Af illustrated in FIG. 10 and FIG. 11 has a first opening 64A, and the second insulating member 61B has a second opening 65A. Moreover, the length of the first opening 64A and the second opening 65A in the Y direction is greater than the length of the fusible conductor sheets 50*a* to 50*f* and the protruding portion 20*a* of the shielding member 20 in the Y direction. Thus, after the fusible conductor sheets 50*a* to 50*f* are cut off, the protruding portion 20*a* is inserted into the first opening 64A and the second opening 65A and the fusion portions of the fusible conductor sheets 50*a* to 50*f* are reliably shielded.

Each of the first insulating members 61Aa to 61Af and the second insulating member 61B respectively include, on both end sides in the Y direction, a ventilation hole 67A for efficiently releasing an increase in pressure, which accompanies arc discharge generated during cutoff of the fuse element, to the pressing means housing space of the insulating case. In the examples illustrated in the figures, each of the first insulating members 61Aa to 61Af and the second insulating member 61B have five respective ventilation holes 67A, respectively on both end sides in the Y direction, and interposing the first opening 64A or the second opening 65A on the left and right, but the number thereof is not limited.

The increase in pressure generated by the arc discharge passes through the ventilation hole 67A and is efficiently released to the space that houses the pressing means 30 of the insulating case 10 via the gaps (not illustrated) of the four corners provided between the pressing means support portion 20*b* and the second holding member 10BBb.

Furthermore, as a result, the shielding action of the shielding member 20 is carried out smoothly and breakdown of the first insulating members 61Aa to 61Af and the second insulating member 61B is prevented.

The first opening 64A and the second opening 65A are positioned facing the fusion portion 53 arranged between the first end portion 51 and the second end portion 52 of the fusible conductor sheets 50*a* to 50*f*.

The materials of the first insulating members 61Aa to 61Af and the second insulating member 61B are preferably the same as the materials of the first insulating members 60Aa to 60Af and the second insulating member 60B, and a similar type of material can be used.

The holding members 10BB (the second holding member 10BBb arranged on the upper side in the Z direction and a first holding member 10BBa arranged on the lower side in the Z direction) illustrated in FIG. 10(*a*) and FIG. 10(*b*) are shaped to correspond to the modified examples of the first insulating member and the second insulating member.

Protective Element (Second Embodiment)

FIG. 12 to FIG. 15 are schematic diagrams illustrating the protective element according to the second embodiment of the present invention. In relation to the protective element according to the second embodiment, the main difference from the protective element according to the first embodiment is that as a mechanism for cutting off the current path, there is no active cutoff mechanism using a heat-generating body, and there is only an overcurrent cutoff mechanism to cut off the current path by fusing the fusible conductor sheet when an overcurrent that exceeds the rated current flows through the fusible conductor sheet. Specifically, in relation to the protective element according to the second embodiment, the main difference from the protective element according to the first embodiment is that there is no heat-generating body and no power supply member.

In the drawings below, components that are the same as or substantially the same as those in the protective element according to the first embodiment will be given the same reference numerals and descriptions thereof will be omitted.

Figure 13:
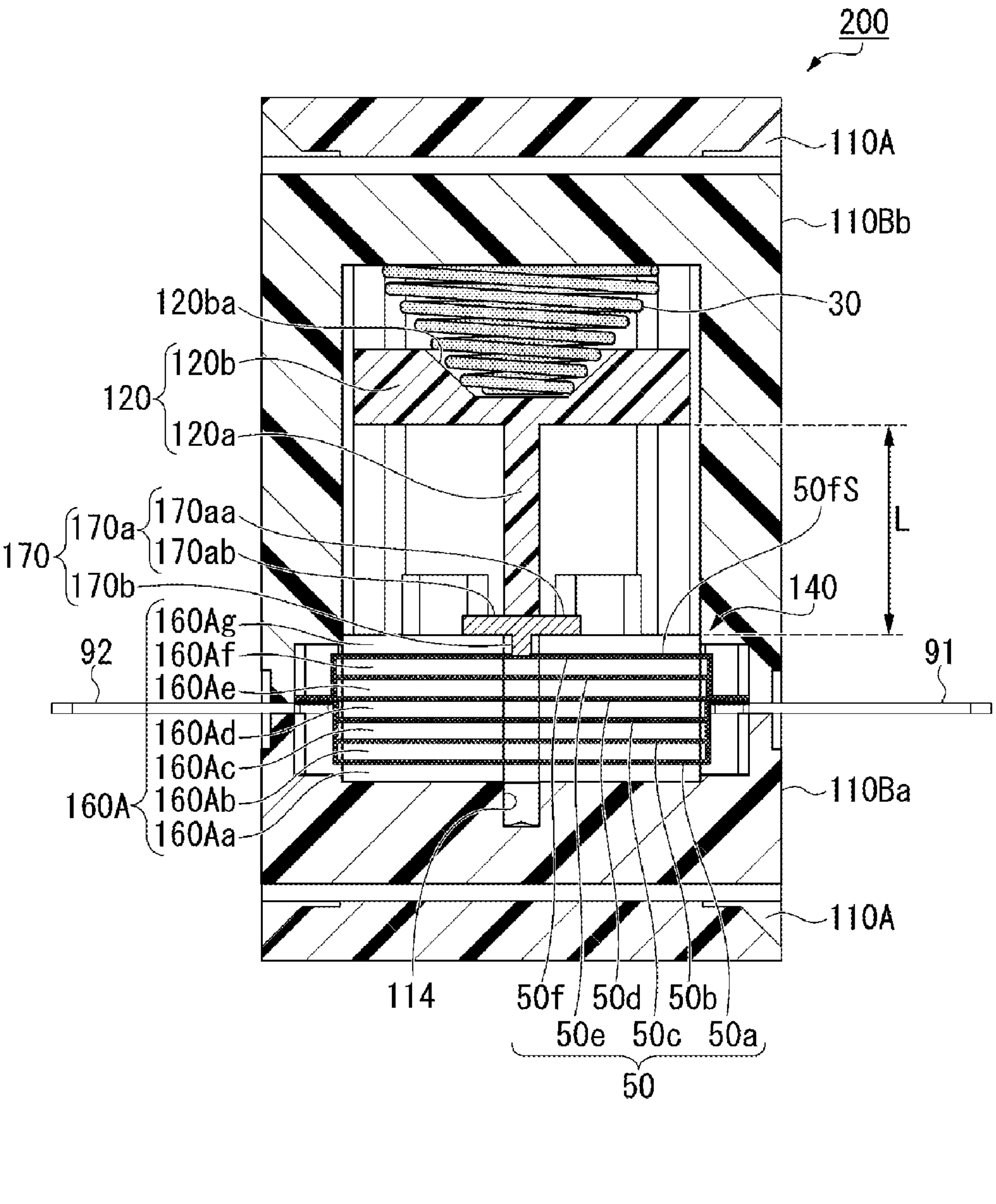
FIG. 13 is a cross-sectional view of the protective element according to the second embodiment, corresponding to FIG. 5(*a*).
Figure 14:
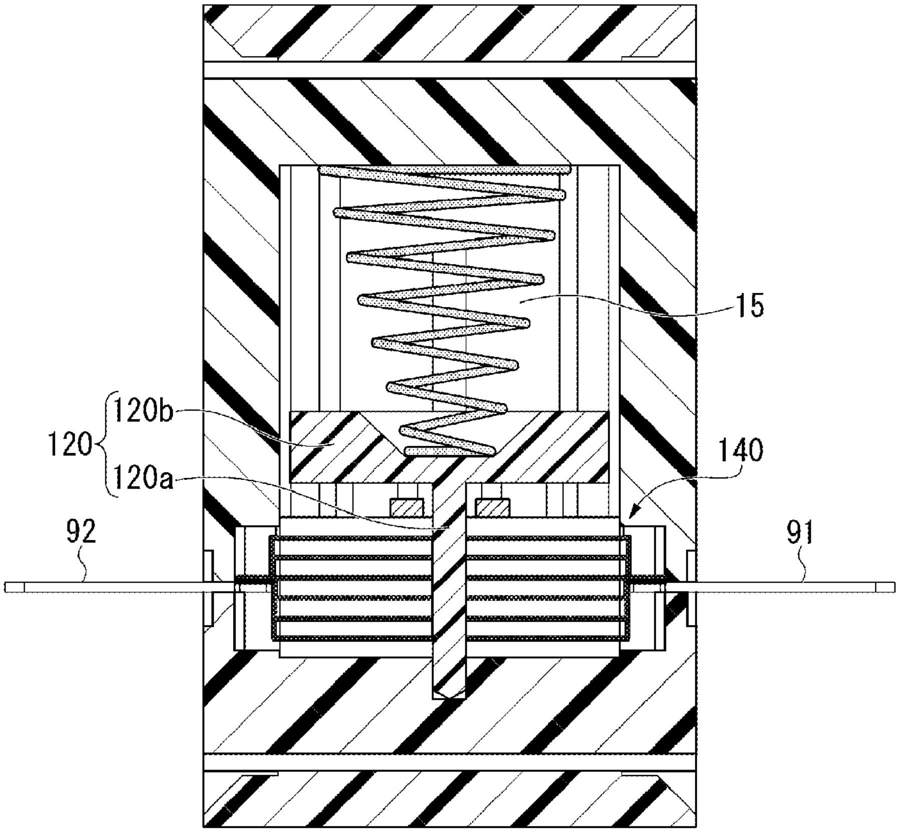
FIG. 14 is a cross-sectional view of the protective element in a state wherein the shielding member divides the fuse element and is all the way down.
Figure 15:
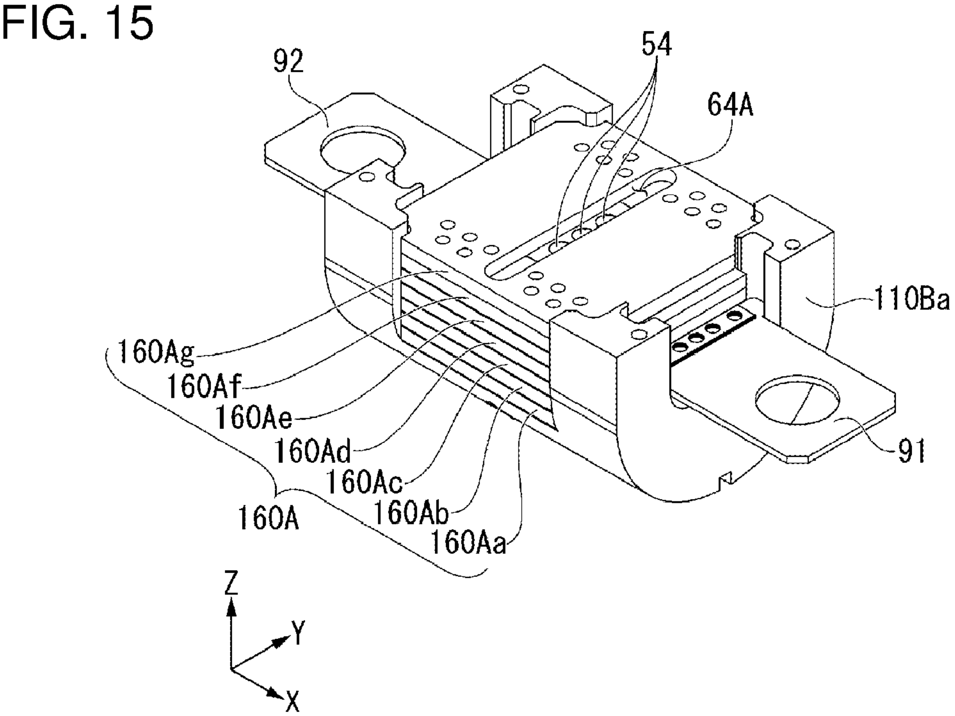
FIG. 15 is a perspective view schematically illustrating a state wherein a fuse element stacked body, a first terminal, and a second terminal are disposed on a first holding member.

FIG. 12(*a*) is a diagram corresponding to FIG. 2, and is a partial perspective view schematically illustrated for viewing the interior of the protective element, wherein (b) is a perspective view of the shielding member. FIG. 13 is a cross-sectional view of the protective element according to the second embodiment, corresponding to FIG. 5(*a*). FIG. 14 is a cross-sectional view corresponding to FIG. 6, and is a cross-sectional view of a protective element in a state wherein a shielding member has cut the fuse element and is all the way down. FIG. 15 is a perspective view schematically illustrating a state wherein the fuse element stacked body, the first terminal, and the second terminal are disposed on a first holding member.

A protective element 200, illustrated in FIG. 12 to FIG. 15, has an insulating case 11, a fuse element stacked body 140, a first insulating member 160A, a shielding member 120, the pressing means 30, and the locking member 70. Note that in the protective element 200 of the present embodiment, the current carrying direction means the direction in which electricity flows during use (X direction), and the cross-sectional area of the current carrying direction means the area of the surface (Y-Z surface) in the direction orthogonal to the current carrying direction.

(Insulating Case)

The insulating case 11 has a substantially oblong cylindrical shape (an ellipse at any position where a cross section on the Y-Z surface is in the X direction). The insulating case 11 is made up of a cover 110A and a holding member 110B.

The protective element 200 does not have a heat-generating body and a power supply member, so accordingly, the cover 110A and the holding member 110B not having a site for a heat-generating body or a site for a power supply member is a difference that pertains to the cover 10A and the holding member 10B.

The holding member 110B is made up of a first holding member 110Ba arranged on the lower side in the Z direction and a second holding member 110Bb arranged on the upper side in the Z direction.

The external shape of the cover 110A and the holding member 110B is small and has a substantially oblong cylindrical shape so as to withstand internal rises in internal pressure due to arc discharge, suppressing the amount of material used, but the external shape is not limited to a substantially oblong cylindrical shape and can take on any shape such as a rectangular parallelepiped as long as no breakdown occurs due to arc discharge according to the rated voltage, rated current, and cutoff capacity of the protective element.

An internal pressure buffer space 15 (see FIG. 14) is formed inside the holding member 110B. The internal pressure buffer space 15 acts to suppress rapid rises in internal pressure in the protective element 200 by gas generated by arc discharge caused when the fuse element stacked body 140 fuses.

Materials similar to those of the cover 10A and the holding member 10B can be used as materials for the cover 110A and the holding member 110B.

(Fuse Element Stacked Body)

The fuse element stacked body 140 includes the plurality of fusible conductor sheets 50 (the plurality of fusible conductor sheets may collectively be referred to as the fuse element 50) arranged in parallel in the thickness direction, and a plurality of the first insulating member 160A (160Aa to 160Ag), which is arranged between each of the plurality of fusible conductor sheets 50 and arranged on the lowermost and uppermost of the plurality of fusible conductor sheets 50, in a state proximal to or in contact with an outer side of the fusible conductor sheets 50, and in which a first opening is formed. The fuse element stacked body 140 is made up of a fuse element and a first insulating member.

The plurality of fusible conductor sheets 50 has the same configuration as that illustrated in FIG. 4, and a description of the characteristics described above will therefore be omitted. Furthermore, the plurality of first insulating members 160A (160Aa to 160Ag) are all members having the same configuration, have the same configuration as the first insulating member 61A illustrated in FIG. 10(*b*), and a description of the characteristics described above will therefore be omitted.

The protective element 200 illustrated in FIG. 12 to FIG. 15 differs in that a first insulating member is provided in a location corresponding to the second insulating member 60B provided by the protection element 100. The protective element 200 may also be provided with an insulating member having a configuration different from that of the first insulating member, instead of the first insulating member arranged on the uppermost part.

Here, in the protective element 100, the second insulating member 60B is different from the first insulating member 60A in that a location is provided where the heat-generating body 80 is arranged, and the like. However, the first insulating member 60A can be replaced by a similar configuration, and in this case, there is no difference in configuration between the second insulating member 60B and the first insulating member 60A. In such a case, the protective element 100 and the fuse element stacked body 40 are made up of a fuse element and the first insulating member.

The fuse element stacked body 140 has six fusible conductor sheets 50*a*, 50*b*, 50*c*, 50*d*, 50*c*, and 50*f* arranged in parallel in the thickness direction (Z direction). First insulating members 160Ab, 160Ac, 160Ad, 160Ae, and 160Af are arranged between each of the fusible conductor sheets 50*a* to 50*f*. The first insulating members 160Ab to 160Af are arranged in a state proximal to or in contact with each of the fusible conductor sheets 50*a* to 50*f*. When in a proximal state, the distance between the first insulating members 160Ab to 160Af and the fusible conductor sheets 50*a* to 50*f* is preferably 0.5 mm or less, and more preferably 0.2 mm or less.

Moreover, the first insulating member 160Aa is arranged on an outer side of the fusible conductor sheet 50*a* arranged on the lowermost of the fusible conductor sheets 50*a* to 50*f*. Additionally, the first insulating member 160Ag is arranged on an outer side of the fusible conductor sheet 50*f* arranged on the uppermost of the fusible conductor sheets 50*a* to 50*f*. The width (length in the Y direction) of the fusible conductor sheets 50*a* to 50*f* is narrower than the width of the first insulating members 160Aa to 160Ag.

The fuse element stacked body 140 is an example wherein the plurality of fusible conductor sheets is six, but the present invention is not limited to six, and is sufficient as long as there is a plurality.

Moreover, in each of the fusible conductor sheets 50*a* to 50*f*, the fusion portion 53, which is configured to readily be fused, is readily cut by a protruding portion 120*a* of the shielding member 120.

The thickness of the fusible conductor sheets 50*a* to 50*f* is a thickness that is fused by an overcurrent. The specific thickness depends on the material or number (number of sheets) of the fusible conductor sheets 50*a* to 50*f* and a pressing force (stress) of the pressing means 30, however, for example, in the case that the fusible conductor sheets 50*a* to 50*f* are a copper foil, a range can be set to 0.01 mm to 0.1 mm as a standard.

Moreover, in the case that the fusible conductor sheets 50*a* to 50*f* are a foil having Ag plated on a periphery of an alloy whose principal component is Sn, a range can be set to 0.1 mm to 1.0 mm as a standard.

Each of the first insulating members 160Aa to 160Ag include a first opening 64A that permits movement (passage) of the protruding portion 120*a* of the shielding member 120 to the central portion in the X direction.

Each of the first insulating members 160Aa to 160Ag include a ventilation hole 67A for efficiently releasing an increase in pressure, which accompanies arc discharge generated during cutoff of the fuse element, to the pressing means housing space of the insulating case. In the examples illustrated in the figures, the first insulating members 160Aa to 160Ag respectively have five each of the ventilation hole 67A interposing the first opening 64A on both end sides in the Y direction and on the left and right, but the number thereof is not limited.

The increase in pressure generated by the arc discharge passes through the ventilation hole 67A and is efficiently released to the space that houses the pressing means 30 of the insulating case 11 via the gaps (not illustrated) of the four corners provided between a pressing means support portion 120*b* and the second holding member 110Bb.

Furthermore, as a result, the shielding action of the shielding member 120 is carried out smoothly and breakdown of the first insulating members 160Aa to 160Ag is prevented.

The first opening 64A is positioned facing the fusion portion 53 arranged between the first end portion 51 and the second end portion 52 of the fusible conductor sheets 50*a* to 50*f*.

(Shielding Member)

The shielding member 120 includes the protruding portion 120*a*, which faces the fuse element stacked body 140 side, and the pressing means support portion 120*b*, which includes a recessed portion 120*ba* that houses and supports a lower portion of the pressing means 30. An interposing groove 120*a*A for interposing the locking member 70 is provided on the leading edge of the protruding portion 120*a*. The shielding member 120 has three interposing grooves 120*a*A, but the present invention is not limited to this number.

Downward movement of the shielding member 120 is suppressed by the locking member 70 in a state wherein the pressing force of the pressing means 30 is applied downward. Because the projecting portion 70Ab of the locking member 70 is in contact with the fusible conductor sheet 50*f*, when an overcurrent that exceeds the rated current flows through the fusible conductor sheet, the locking member 70 transfers heat, the temperature thereof rises, and softening occurs at a temperature at or above the softening temperature. Moreover, when a large overcurrent flows and the fusible conductor sheet 50*f* is fused instantly, the generated arc discharge also flows to the locking members 70, and the locking members 70 soften at a temperature at or above the softening temperature. The softened locking members 70 are easily physically cut by the protruding portion 120*a* of the shielding member 120 pressed by the pressing force of the pressing means 30.

When the locking member 70 is cut and the downward movement suppression by the locking member 70 is disengaged, the shielding member 120 moves downward and physically cuts the fusible conductor sheets 50*a* to 50*f*.

The shielding member 120 has a leading edge 120*aa* of the protruding portion 120*a* that is pointed, formed to readily cut through the fusible conductor sheets 50*a* to 50*f*.

FIG. 14 illustrates a cross-sectional view of the protective element in a state wherein the shielding member 120 has moved through the first opening 64A of the fuse element stacked body 140, cut through the fusible conductor sheets 50*a*, 50*b*, 50*c*, 50*d*, 50*c*, and 50*f* using the protruding portion 120*a*, and the shielding member 120 is all the way down.

When the shielding member 120 moves down through the first opening 64A of the fuse element stacked body 140 and cuts the fusible conductor sheets 50*f*, 50*c*, 50*d*, 50*c*, 50*b*, and 50*a* in order using the protruding portion 120*a* of the shielding member 120, the cut surfaces are shielded and insulated from each other by the protruding portion 120*a*, and the current carrying path through each of the fusible conductor sheets is physically cut off in a reliable manner. Thus, arc discharge is quickly eliminated (extinguished).

Moreover, when the shielding member 120 moves through the first opening 64A of the fuse element stacked body 140 and is all the way down, the pressing means support portion 120*b* of the shielding member 120 presses the fuse element stacked body 140 from the first insulating member 160Ag, and the fusible conductor sheet and the first insulating members 160Aa to 160Ag adhere to each other, by which a space where arc discharge can continue disappears therebetween and arc discharge is reliably eliminated.

The thickness (length in the X direction) of the protruding portion 120*a* is smaller than the width of the first opening 64A of the first insulating members 160Aa to 160Ag in the X direction. According to this configuration, the protruding portion 120*a* can move downward in the Z direction through the first opening 64A.

For example, when the fusible conductor sheets 50*a* to 50*f* are a copper foil, the difference between the thickness of the protruding portion 120*a* and the width of the first opening 64A in the X direction can be set to, for example, 0.05 to 1.0 mm, and is preferably set to 0.2 to 0.4 mm. When 0.05 mm or greater, the movement of the protruding portion 120*a* becomes smooth even if the end portion of the fusible conductor sheets 50*a* to 50*f* when the cut minimum thickness is 0.01 mm enters the gap between the first insulating members 160Aa to 160Ag and the protruding portion 120*a*, and the arc discharge is eliminated more quickly and reliably. This is because the protruding portion 120*a* is difficult to catch when the difference described above is 0.05 mm or more. Moreover, when the difference is 1.0 mm or less, the first opening 64A functions as a guide for moving the protruding portion 120*a*. Therefore, a positional shift of the protruding portion 120*a* while moving during fusion of the fusible conductor sheets 50*a* to 50*f* is prevented, and arc discharge is more quickly and reliably eliminated. When the fusible conductor sheets 50*a* to 50*f* are a foil having Ag plated on a periphery of an alloy whose principal component is Sn, the difference between the thickness of the protruding portion 120*a* and the width of the first opening 64A in the X direction can be set to 0.2 to 2.5 mm, for example, and is preferably set to 0.22 to 2.2 mm.

The width (length in the Y direction) of the protruding portion 120*a* is wider than the width of the fusible conductor sheets 50*a* to 50*f* of the fuse element stacked body 140. According to this configuration, the protruding portion 120*a* can cut each of the fusible conductor sheets 50*a* to 50*f*.

The length L of the protruding portion 120*a* in the Z direction has a length such that the leading edge 120*aa* of the protruding portion 120*a* can reach below the first insulating member 160Aa arranged lowermost of the first insulating members 160Aa to 160Ag in the Z direction when the protruding portion is all the way down in the Z direction. When below the first insulating member 160Aa arranged lowermost, the protruding portion 120*a* is inserted into an insertion hole 114 formed on an inner bottom surface of the holding member 110Ba.

According to this configuration, the protruding portion 120*a* can cut each of the fusible conductor sheets 50*a* to 50*f*.

(Pressing Means)

The pressing means 30 is housed in the recessed portion 120*ba* of the shielding member 120 while the shielding member 120 is pressed downward in the Z direction.

For the pressing means 30, the same means can be used as that provided in the protective element 100.

(Locking Member)

For the configuration (shape and material) of a locking member 170, the same configuration can be used as that of the locking members 70.

The protective element 200 is provided with three locking members 170, but the present invention is not limited to three locking members.

Holding is performed while inserted into the interposing groove 120*a*A provided on the leading edge 120*aa* of the protruding portion 120*a* of the shielding member 120.

The locking members 170 have a T-shape and have a horizontally extending portion (support portion) 170*a*, made up of a first arm portion 170*aa* and a second arm portion 170*ab*, and a vertically extending portion (projecting portion) 170*b* extending downward from the central portion of the horizontally extending portion 170*a*.

In the protective element 200, the horizontally extending portion 170*a* is supported on a shielding member-side surface 160AgS, the first arm portion 170*aa* and the second arm portion 170*ab* respectively interposing the first opening 64A of the first insulating member 160Ag, and the lower end of the vertically extending portion 170*b* is supported on the shielding member-side surface 50*f*S of the fusible conductor sheet 50*f*. In the examples illustrated in the figures, the shielding member-side surface 160AgS of the first insulating member 160Ag does not have a groove where the locking members 170 are mounted, but may have a groove where the locking members 170 are mounted.

When the vertically extending portion 170*b* is supported on a shielding member-side surface 50*f*S of the fusible conductor sheet 50*f*, when an overcurrent that exceeds the rated current flows through the fusible conductor sheet 50*f*, the locking members 170 contacting the fusible conductor sheet 50*f* transfer heat, the temperature thereof rises, and softening occurs at a temperature at or above the softening temperature.

In the protective element 200, sites on both the horizontally extending portion 170*a* and the vertically extending portion 170*b* are supported, but either one being supported is acceptable. However, it is preferable that the vertically extending portion 170*b* be supported in contact with the shielding member-side surface 50*f*S of the fusible conductor sheet 50*f* so as to be softened when an overcurrent that exceeds the rated current flows through the fusible conductor sheet 50*f*. When the vertically extending portion 170*b* is not in contact with the shielding member-side surface 50*f*S of the fusible conductor sheet 50*f*, it is preferably proximal to the shielding member-side surface 50*f*S.

All three locking members 170 have the same shape, but different shapes may be included.

When the temperature of the locking members 170 is at or above the softening temperature, the locking member softens enough to deform due to external forces.

The softened locking members 170 are easily physically cut by the protruding portion 120*a* of the shielding member 120 pressed by the pressing force of the pressing means 30. When the locking members 170 are cut, the protruding portion 120*a* of the shielding member 120 is inserted downward in the Z direction through the first opening 64A.

When the protruding portion 120*a* is inserted downward in the Z direction through the first opening 64A, the protruding portion 120*a* plunges on while cutting the fusible conductor sheets until reaching the lowest position. Thus, the protruding portion 120*a* shields the fusible conductor sheets 50*a* to 50*f* on the first terminal 91 side and the second terminal 92 side at the fusion portion 53 thereof. Thus, arc discharge generated when the fusible conductor sheets 50*a* to 50*f* are cut can be quickly and reliably eliminated.

Among the locking members 170, the vertically extending portion 170*b* is in contact with the fusible conductor sheet 50*f*. Therefore, when an overcurrent that exceeds the rated current flows through the fusible conductor sheet, the locking members 170 in contact with the fusible conductor sheet 50*f* transfer heat, the temperature thereof rises, and softening occurs at a temperature at or above the softening temperature.

Moreover, when a large overcurrent flows and the fusible conductor sheet 50*f* is fused instantly, the generated arc discharge also flows to the locking member 170, and the locking member 170 softens at a temperature at or above the softening temperature.

The softened locking members 170 are easily physically cut by the protruding portion 120*a* of the shielding member 120 pressed by the pressing force of the pressing means 30. When the locking members 170 are cut, the protruding portion 120*a* of the shielding member 120 is inserted downward in the Z direction through the first opening 64A.

In this case, an overcurrent that exceeds the rated current flows, the fusible conductor sheet is thermally fused, and the protruding portion 120*a* is inserted as-is downward in the Z direction through the first opening 64A. At this time, the protruding portion 120*a* shields the fusible conductor sheets 50*a* to 50*f* on the first terminal 91 side and the second terminal 92 side by the fusion portions thereof. Thus, arc discharge generated when the fusible conductor sheets 50*a* to 50*f* are cut can be quickly and reliably eliminated.

Even if the fusible conductor sheets are not yet thermally fused, when the protruding portion 120*a* is inserted downward in the Z direction through the first opening 64A, the protruding portion 120*a* plunges on while cutting the fusible conductor sheets until reaching the lowest position. Thus, the protruding portion 120*a* shields the fusible conductor sheets 50*a* to 50*f* on the first terminal 91 side and the second terminal 92 side at the fusion portions thereof. Thus, arc discharge generated when the fusible conductor sheets 50*a* to 50*f* are cut off can be quickly and reliably eliminated.

The protective element 200 according to the second embodiment, other than not having a heat-generating body or power supply member, has many members that are the same or similar to the protective element 100 according to the first embodiment, so description of a manufacturing method thereof is omitted.

In the protective element 200 of the present embodiment, when an overcurrent that exceeds the rated current flows through the fuse element 50 (the plurality of fusible conductor sheets 50*a* to 50*f*), the fuse element 50 is thermally fused to cut off the current path.

In the protective element 200 of the present embodiment, because the movement of the shielding member 120 to which a pressing force is applied by the pressing means 30 is suppressed by the locking members 170, a cutting pressing force is not applied by the pressing means 30 and the shielding member 120 to the fuse element 50 (the plurality of fusible conductor sheets 50*a* to 50*f*) other than when the current path is cut off. Therefore, deterioration of the fuse element 50 over time is suppressed, and when there is no need to cut off the current path, disconnection stemming from the state wherein the pressing force is applied when the temperature of the fuse element 50 rises can be prevented.

In the protective element 200 of the present embodiment, the fuse element stacked body 140 includes the plurality of fusible conductor sheets 50*a* to 50*f* arranged in parallel in the thickness direction, and each of the fusible conductor sheets 50*a* to 50*f* is insulated by being proximal to or in contact with (adhered to) the first insulating members 160Ab to 160Af arranged therebetween and the first insulating members 160Aa to 160Ag arranged outside of the fusible conductor sheets 50*a* and 50*f*. Therefore, the current value flowing through each of the fusible conductor sheets 50*a* to 50*f* lessens and the space surrounding the fusible conductor sheets 50*a* to 50*f* becomes extremely narrow, making the scale of arc discharge generated by fusion more likely to be low. Therefore, according to the protective element 200 of the present embodiment, the size of the insulating case 11 can be made smaller and lighter.

In the protective element 200 of the present embodiment, when the first insulating member 160Aa is arranged between the fusible conductor sheet 50*a* arranged on the lowermost of the fusible conductor sheets 50*a* to 50*f* and the first holding member 110Ba of the insulating case 11, and the first insulating member 160Ag is arranged between the fusible conductor sheet 50*f* arranged on the uppermost of the fusible conductor sheets 50*a* to 50*f* and the second holding member 110Bb of the insulating case 11, the fusible conductor sheets 50*a* and 50*f* do not make direct contact with the first holding member 110Ba and the second holding member 110Bb, so carbides forming a conduction path on an inner surface of the insulating case 11 due to arc discharge form less readily, and in turn, leak current occurs less readily even if the size of the insulating case 11 is reduced.

In the protective element 200 of the present embodiment, when the first insulating members 160Aa to 160Ag have an opening at a position facing the fusion portion 53 of the first end portion 51 and the second end portion 52 of the fusible conductor sheets 50*a* to 50*f*, continuous adhesion of melted scattered material on the surfaces of the first insulating members 160Aa to 160Ag can be suppressed when the fusible conductor sheets 50*a* to 50*f* are fused at the fusion portion 53. Therefore, arc discharge caused by fusion of the fusible conductor sheets 50*a* to 50*f* can be extinguished early.

In the protective element 200 of the present embodiment, when at least one of the first insulating members 160Aa to 160Ag, the shielding member 120, the cover 110A of the insulating case 11, and the holding member 110B is formed of a material having a tracking resistance index CTI of 500 V or greater, carbides forming a conduction path on a surface of these components due to arc discharge form less readily, and in turn, leak current occurs less readily even if the size of the insulating case 11 is reduced.

In the protective element 200 of the present embodiment, when at least one of the first insulating members 160Aa to 160Ag, the shielding member 120, the cover 110A of the insulating case 11, and the holding member 110B is formed of a polyamide-based resin or a fluorine-based resin, the polyamide-based resin or the fluorine-based resin has excellent insulating properties and tracking resistance, making it easier to reduce both size and weight.

In the protective element 200 of the present embodiment, each of the fusible conductor sheets 50*a* to 50*f* is a stacked body containing a low melting point metal layer and a high melting point metal layer and when the low melting point metal layer contains Sn and the high melting point metal layer contains Ag or Cu, melting of the low melting point metal layer causes the high melting point metal to be dissolved by Sn, and therefore, the fusing temperature of the fusible conductor sheets 50*a* to 50*f* is reduced. Furthermore, because Ag and Cu have higher physical strength than Sn, the physical strength of the fusible conductor sheets 50*a* to 50*f*, which are obtained by laminating a high melting point metal layer on a low melting point metal layer, becomes higher than the physical strength of the low melting point metal layer alone. Additionally, Ag and Cu have lower electrical resistivity than Sn, and the electrical resistance value of the fusible conductor sheets 50*a* to 50*f*, which are obtained by laminating a high melting point metal layer on a low melting point metal layer, becomes lower than the electrical resistance value of the low melting point metal layer alone. That is, the fuse element can handle a larger current.

In the protective element 200 of the present embodiment, when each of the fusible conductor sheets 50*a* to 50*f* is a stacked body having two or more high melting point metal layers and one or more low-melting-point metal layers, and the low melting point metal layer is arranged between the high melting point metal layers, the strength of the fusible conductor sheets 50*a* to 50*f* increases due to having the high melting point metal layers on the outer sides. In particular, when connecting the first end portion 51 of the fusible conductor sheets 50*a* to 50*f* and the first terminal 91 as well as the second end portion 52 and the second terminal 92 by soldering, deformation of the fusible conductor sheets 50*a* to 50*f* due to heating during soldering occurs less readily.

In the protective element 200 of the present embodiment, when each of the fusible conductor sheets 50*a* to 50*f* is a single layer containing silver or copper, the electrical resistivity is likely to be lower than when these are a stacked body having high melting point metal layers and a low melting point metal layer. Therefore, the thickness of the fusible conductor sheets 50*a* to 50*f* made up of a single layer containing silver or copper can be reduced while having the same area and the same electrical resistance as the fusible conductor sheets 50*a* to 50*f* made up of a stacked body having high melting point metal layers and a low melting point metal layer. When the thickness of the fusible conductor sheets 50*a* to 50*f* is thin, the amount of melted scattered material when the fusible conductor sheets 50*a* to 50*f* are fused decreases in proportion to the thickness, and the insulation resistance after cutting off increases.

In the protective element 200 of the present embodiment, each of the fusible conductor sheets 50*a* to 50*f* has the through hole 54 provided at the fusion portion 53 and has a fusion portion configured so a cross-sectional area of the fusion portion 53 in the current carrying direction is smaller than a cross-sectional area of the first end portion 51 and the second end portion 52 in the current carrying direction, so the site where fusion occurs when a current that exceeds a rated value flows in a current path is stabilized. Note that although in the protective element 200 of the present embodiment the through hole 54 is provided at the fusion portion 53, the method for reducing the cross-sectional area of the fusion portion 53 is not particularly limited. For example, the cross-sectional area of the fusion portion 53 may be reduced by cutting off both end portions of the fusion portion 53 in a concave shape or by partially reducing the thickness.

Fuse Element Modified Examples

Figure 16:
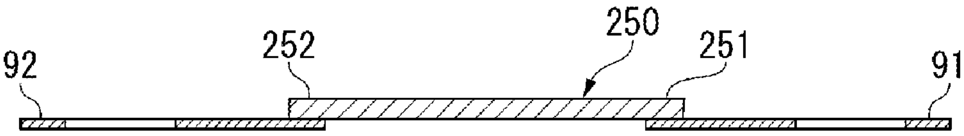
FIG. 16 is a schematic diagram of a modified example of the fuse element, and is a cross-sectional view corresponding to FIG. 4(*c*).
Figure 17:
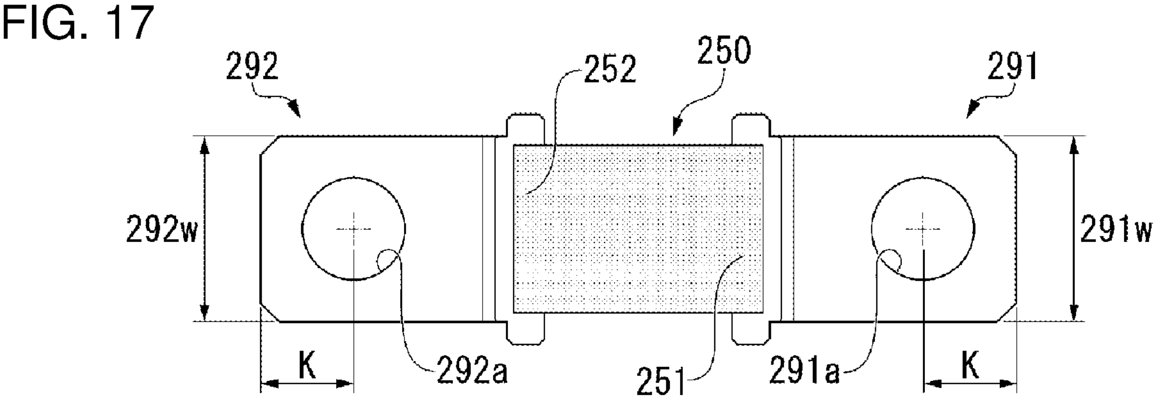
FIG. 17 is a schematic diagram of a modified example of the fuse element, and is a plan view corresponding to FIG. 4(*a*).
Figure 18:
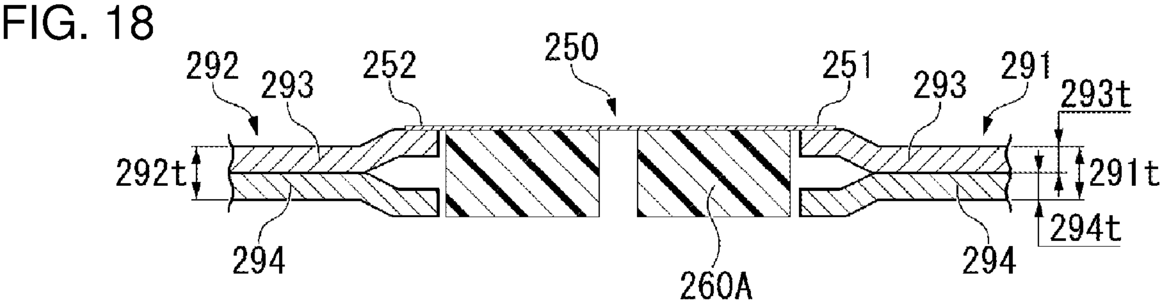
FIG. 18 is a schematic diagram of a modified example of the fuse element, and is a cross-sectional view corresponding to FIG. 4(*c*).

FIG. 16 is a schematic diagram of a modified example of the fuse element, and is a cross-sectional view corresponding to FIG. 4(*c*). FIG. 17 is a schematic diagram of a modified example of the fuse element, and is a plan view corresponding to FIG. 4(*a*). FIG. 18 is a schematic diagram of a modified example of the fuse element, and is a cross-sectional view corresponding to FIG. 4(*c*). In FIG. 16 to FIG. 18, components that are the same as or substantially the same as those in the configurations described above will be given the same reference numerals and descriptions thereof will be omitted.

As illustrated in FIG. 16, the first terminal 91 has at least one end portion connected to a first end portion 251 of a fuse element 250. Moreover, the second terminal 92 has at least one end portion connected to a second end portion 252 of the fuse element 250. In the examples in the figures, the first end portion 251 of the fuse element 250 is connected to the upper surface of the first terminal 91. Moreover, the second end portion 252 of the fuse element 250 is connected to the upper surface of the second terminal 92. Note that the connecting positions of the fuse element 250, the first terminal 91, and the second terminal 92 are not limited to this. For example, the first end portion 251 of the fuse element 250 may be connected to the lower surface of the first terminal 91, and the second end portion 252 of the fuse element 250 may be connected to the lower surface of the second terminal 92.

In the examples in the figures, the fuse element 250 is a single layer. In the case of a single layer, the layer contains Ag or Cu. The single layer may be solely Ag, may be solely Cu, may be an Ag alloy, and may be a Cu alloy. The material of the single layer is not limited.

The first terminal 91 and the second terminal 92 may be substantially the same shape or may have different shapes. In the examples in the figures, the first terminal 91 and the second terminal 92 are respectively configured of a single component, but are not limited thereto. The thickness of the first terminal 91 and the second terminal 92 is not particularly limited, but may be within a range of, for example, 0.3 mm or more and 1.0 mm or less. The thickness of the first terminal 91 and the thickness of the second terminal 92 may be the same or may be different.

As illustrated in FIG. 17, a first terminal 291 is provided with an external terminal hole 291*a*. Moreover, a second terminal 292 is provided with an external terminal hole 292*a*. One of the external terminal hole 291*a* and the external terminal hole 292*a* is used for connecting to the power source side, and the other is used for connecting to the load side. Alternatively, the external terminal hole 291*a* and the external terminal hole 292*a* may be used to be connected to the internal current carrying path of the load. The external terminal hole 291*a* and the external terminal hole 292*a* can be formed into a through-hole that is substantially circular in plan view.

As illustrated in FIG. 18, the first terminal 291 and the second terminal 292 may respectively be configured of two components (a terminal upper portion 293 and a terminal lower portion 294). For example, the terminal upper portion 293 and the terminal lower portion 294 may be integrated by fitting. For example, the terminal upper portion 293 and the terminal lower portion 294 may have a symmetrical shape across the horizontal which is integrated by inverting across the horizontal. For example, the terminal upper portion 293 and the terminal lower portion 294 may be substantially the same shape or may have different shapes. Thicknesses of the terminal upper portion 293 and the terminal lower portion 294, 293*t* and 294*t*, are not particularly limited, but may be within a range of, for example, 0.3 mm or more and 2.0 mm or less. The thickness 293*t* of the terminal upper portion 293 and the thickness 294*t* of the terminal lower portion 294 may be the same or may be different.

For example, when the first terminal 291 and the second terminal 292 are configured of the terminal upper portion 293 and the terminal lower portion 294, one end portion of the terminal upper portion 293 of the first terminal 291 may be connected to the first end portion 251 of the fuse element 250, and one end portion of the terminal upper portion 293 of the second terminal 292 may be connected to the second end portion 252 of the fuse element 250. In the examples in the figures, the first end portion 251 of the fuse element 250 is connected to the upper surface of the terminal upper portion 293 of the first terminal 291, and the second end portion 252 of the fuse element 250 is connected to the upper surface of the terminal upper portion 293 of the second terminal 292. Note that the connecting positions of the fuse element 250, the first terminal 291, and the second terminal 292 are not limited to this. For example, the first end portion 251 of the fuse element 250 may be connected to the lower surface of the terminal lower portion 294 of the first terminal 291, and the second end portion 252 of the fuse element 250 may be connected to the lower surface of the terminal lower portion 294 of the second terminal 292.

In the examples in the figures, a first insulating member 260A is a single layer and is arranged in a state proximal to or in contact with the fuse element 250, but is not limited thereto. In the examples in the figures, the first insulating member 260A is a single layer, but is not limited thereto. For example, a plurality (for example, three) of the first insulating member may be arranged in a state proximal to or in contact with each other.

(Terminal Specifications)

For example, specifications for the first terminal 291 and the second terminal 292 (terminal specifications) can be set to specifications in common with the specifications for rated current (for example, 100 A to 300 A). For example, when employing M8 screws (8 mm diameter screws) as the bolt specification for fastening a terminal, 2.0 mm can be employed for thicknesses 291*t* and 292*t* of the first terminal 291 and the second terminal 292 (terminal thickness). Note that the bolt specification and terminal specifications are not limited to the above.

For example, when employing M8 screws as the bolt specification, the following can be set for the terminal specifications: 9 mm for the diameter of the external terminal hole 291*a* and the external terminal hole 292*a* (terminal hole diameter), 17.5 mm for widths 291*w* and 292*w* of the first terminal 291 and the second terminal 292 (terminal width), 9.1 mm for the distance K from the terminal hole center to the terminal outer end, and 2 mm for the thicknesses 291*t* and 292*t* (two terminals 1 mm thick) of the first terminal 291 and the second terminal 292 (terminal thickness). Note that each of the values above is a mere example and the present invention is not limited thereto.

For example, as the screw diameter increases, the tightening torque increases and the tightening surface area grows depending on washer diameter enlargement, and contact resistance tends to decrease, which is effective in dealing with large currents. For example, by employing M8 screws as the bolt specification, contact resistance tends to decrease compared to when employing M5 screws, which is effective in dealing with large currents.

For example, as the terminal thickness increases, overall resistance tends to decrease due to the reduced resistance that accompanies growing cross-sectional surface area and due to the lowered contact resistance that accompanies growing rigidity, which is effective in dealing with large currents. For example, by setting the terminal thickness to 2.0 mm when employing M8 screws as the bolt specification, overall resistance tends to decrease compared to when setting the terminal thickness to 0.5 mm when employing M5 screws, which is effective in dealing with large currents.

In the present modified example, the terminal thickness when employing M8 screws as the bolt specification is set to 2.0 mm. This tends to reduce contact resistance compared to when employing M5 screws, and overall resistance tends to decrease compared to when setting the terminal thickness to 0.5 mm, which is effective in dealing with large currents. Therefore, even when there is only one of the fuse element 250, a resistance value capable of satisfying product performance can be obtained. That is, as the number of fuse elements 250 can be reduced, the present invention is suited to reductions in the number of components.

Protective Element (Third Embodiment)

Figure 19:
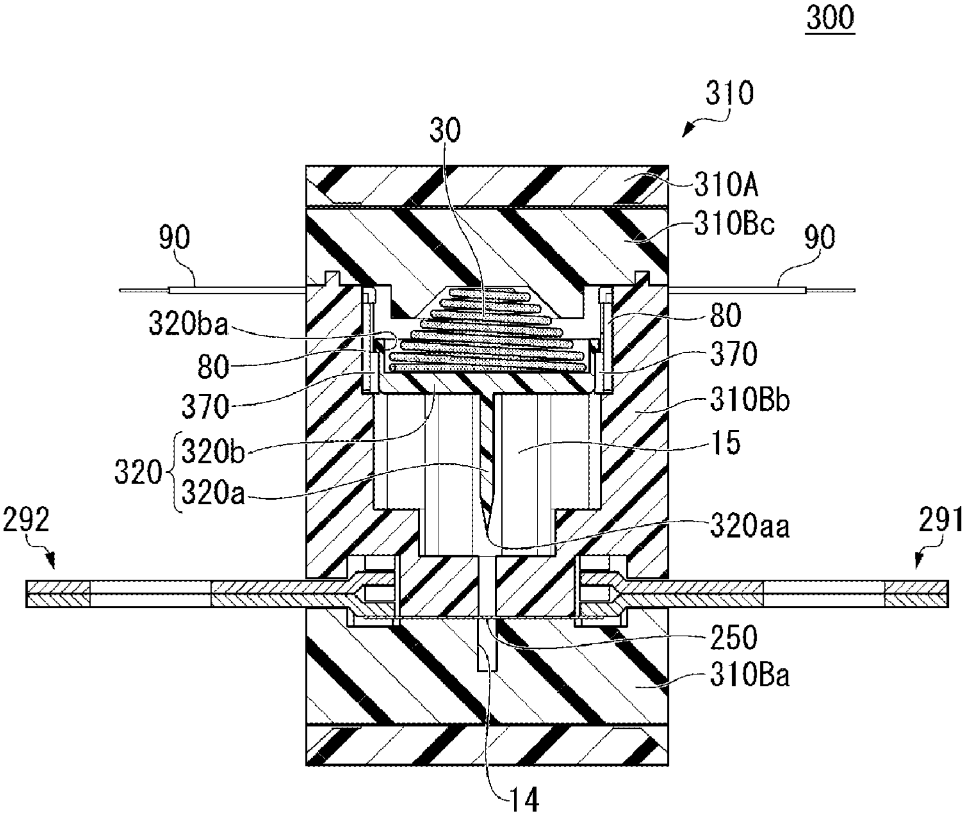
FIG. 19 is a cross-sectional view of the protective element according to the third embodiment, corresponding to FIG. 5(*a*).

FIG. 19 is a cross-sectional view of the protective element according to the third embodiment of the present invention, corresponding to FIG. 5(*a*). In relation to the protective element according to the third embodiment, the main difference from the protective element according to the first embodiment is that the fuse element is interposed between two case components. In FIG. 19, components that have the same or substantially the same configuration as those in the protective element according to the first embodiment and the modified examples described above will be given the same reference numerals and descriptions thereof will be omitted.

The protective element 300 illustrated in FIG. 19 has an insulating case 310, a fuse element 250, a shielding member 320, the pressing means 30, a locking member 370, the heat-generating body 80, the power supply member 90, a first terminal 291, and a second terminal 292. Note that in the protective element 300 of the present embodiment, the current carrying direction means the direction in which electricity flows during use (X direction), and the cross-sectional area of the current carrying direction means the area of the surface (Y-Z surface) in the direction orthogonal to the current carrying direction.

(Insulating Case)

The insulating case 310 is made up of a cover 310A and a holding member 310B. Materials similar to those of the cover 10A and the holding member 10B can be used as materials for the cover 310A and the holding member 310B. An internal pressure buffer space 15 is formed inside the holding member 310B. The internal pressure buffer space 15 acts to suppress rapid rises in internal pressure in the protective element 300 by gas generated by arc discharge caused when the fuse element 250 fuses.

The holding member 310B is made up of a first holding member 310Ba arranged on the lower side in the Z direction and a second holding member 310Bb arranged on the upper side in the Z direction. The second holding member 310Bb is one example of two case components, and the first holding member 310Ba is another example of two case components.

In the examples in the figures, the insulating case 310 is made up of at least two case components (the first holding member 310Ba arranged on the lower side in the Z direction and the second holding member 310Bb arranged on the upper side in the Z direction), and the second holding member 310Bb, which is one case component, is integrated with the first insulating member, but the present invention is not limited thereto. For example, when the protective element has a first insulating member and a second insulating member, one case component may be integrated with the first insulating member and the other case component may be integrated with the second insulating member, and one case component may be integrated with the first insulating member or the other case component may be integrated with the second insulating member.

(Fuse Element)

In the examples in the figures, the fuse element 250 is a single layer. The fuse element 250 has the same configuration as that illustrated in FIG. 18, and a description of the characteristics described above will therefore be omitted.

In the examples in the figures, the fuse element 250 is interposed between the first holding member 310Ba and the second holding member 310Bb, but the present invention is not limited thereto. For example, the fuse element 250 may be arranged between the first holding member 310Ba and the second holding member 310Bb via the first insulating member or the second insulating member. For example, the fuse element 250 may be arranged between the two case components in a state proximal to or in contact with the two case components.

In the examples in the figures, the second holding member 310Bb is integrated with the first insulating member, and the fuse element 250 is arranged along the lower surface of the second holding member 310Bb, but the present invention is not limited thereto. For example, when the first holding member 310Ba is integrated with the first insulating member, the fuse element may be arranged along the upper surface of the first holding member 310Ba. The arrangement of the fuse element 250 with respect to the first holding member 310Ba or the second holding member 310Bb is not limited to the above.

(Shielding Member)

The shielding member 320 includes a protruding portion 320*a*, which faces the fuse element stacked body 250 side, and a pressing means support portion 320*b*, which includes a recessed portion 320*ba* that houses and supports a lower portion of the pressing means 30. The protruding portion 320*a* protrudes toward the fuse element 250 side.

Downward movement of the shielding member 320 is suppressed by the locking member 370 in a state wherein the pressing force of the pressing means 30 is applied downward. Therefore, when the locking member 370 is heated by heat generated by the heat-generating body 80 and softened at a temperature at or above a softening temperature thereof, the shielding member 320 becomes able to move downward. At this time, the softened locking member 370 is physically crushed by the pressing force of the pressing means 30, or is thermally fused, or receives an action combining a physical force from the pressing means 30 and thermal fusion depending on the type of material, heating conditions, and the like.

When the downward movement suppression by the locking member 370 is disengaged, the shielding member 320 moves downward and physically cuts the fuse element 250.

The shielding member 320 has a leading edge 320*aa* of the protruding portion 320*a* that is pointed, formed to readily cut through the fuse element 250.

For example, when the shielding member 320 moves downward and cuts the fuse element 250 using the protruding portion 320*a* of the shielding member 320, the cut surfaces are shielded from each other and insulated by the protruding portion 320*a*, and the current carrying path through the fuse element 250 is physically cut off in a reliable manner. Thus, arc discharge is quickly eliminated (extinguished).

(Pressing Means)

The pressing means 30 is housed in the recessed portion 320*ba* of the shielding member 320 while the shielding member 320 is pressed downward in the Z direction. The pressing means 30 is held in a compressed state in the recessed portion 320*ba* of the shielding member 320. The pressing means 30 has a different arrangement than that illustrated in FIG. 5, but has the same configuration, and a description of the characteristics described above will therefore be omitted.

In the examples in the figures, a conical spring is used as the pressing means 30, the side having a larger outer diameter is arranged facing the fuse element 250 side, and a third holding member 310Bc is arranged above in the Z direction so as to press and contract the conical spring. Therefore, positioning stability increases when the spring is inserted from the upper side of the second holding member 310Bb, and this is preferable to realize automation of the manufacturing process.

(Locking Member)

The locking member 370 suppresses the movement of the shielding member 320. The locking member 370 is provided on the upper portion of the shielding member 320. The locking member 370 is supported by the upper portion of the second holding member 310Bb and the upper portion of the shielding member 320. On the upper portion of the second holding member 310Bb and the upper portion of the shielding member 320, there is a recessed portion that corresponds to a shape and position of the locking member 370, and the recessed portion stably holds the locking member 370 so as to interpose the locking member.

(Heat-Generating Body)

The heat-generating body 80 is mounted so as to contact the outer surface of the locking member 370 in the X direction. The heat-generating body 80 heats and softens the locking member 370 or a fixing member fixing the locking member 370 (for example, solder joining between two locking members 370 or solder joining between the heat-generating body 80 and the locking member 370). In the examples in the figures, the power supply member 90 is connected to each of two heat-generating bodies 80, but the present invention is not limited thereto.

When a current is carried to the heat-generating bodies 80, the heat-generating bodies 80 generate heat and transmit heat to the locking member 370, and the locking member 370 rises in temperature and softens at a temperature at or above the softening temperature. Here, the softening temperature means a temperature or temperature range where a solid phase and a liquid phase mix or coexist. When the temperature of the locking member 370 is at or above the softening temperature, the locking member softens enough to deform due to external forces.

The softened locking member 370 is easily physically pressed and torn by the pressing force of the pressing means 30. When the locking member 370 is pressed and torn or thermally fused, the protruding portion 320*a* of the shielding member 320 is inserted through the gap of the second holding member 310Bb downward in the Z direction. Then, the protruding portion 320*a* plunges on while cutting the fuse element 250 until reaching the lowest position. Thus, the protruding portion 320*a* shields the fuse element 250 on the first terminal 291 side and the second terminal 292 side at the fusion portions thereof. Thus, arc discharge generated when the fuse element 250 is cut can be quickly and reliably eliminated.

Moreover, heat is generated by carrying a current to the heat-generating bodies 80, the heat of which heats, softens, and melts the locking member 370. Melting of the locking member 370 causes the shielding member 320, to which a pressing force is applied downward in the Z direction by the pressing means 30, to move downward, cutting the fuse element 250 and shielding the fuse element 250 on the first terminal 291 side and the second terminal 292 side.

Additionally, when using a composite locking structure that joins two locking members 370 using a fixing member, or when using a structure that joins the locking member 370 and the heat-generating bodies 80 using a fixing member, the heat-generating bodies 80 generate heat by carrying a current therethrough, the heat of which softens and melts the fixing member. Softening and melting of the fixing member causes the shielding member 320, to which a pressing force is applied downward in the Z direction by the pressing means 30, to move downward, cutting the fuse element 250 and shielding the fuse element 250 on the first terminal 291 side and the second terminal 292 side.

Note that when the fixing member softens, the locking member 370 cannot be cut and is released (disengaged).

In the protective element 300 of the present embodiment, the insulating case 310 is made up of at least two case components (the first holding member 310Ba arranged on the lower side in the Z direction and the second holding member 310Bb arranged on the upper side in the Z direction), and the second holding member 310Bb, which is one case component, is integrated with the first insulating member. Therefore, there is no need to provide a separate first insulating member, and the number of components can be reduced, contributing to cost reduction.

In the protective element 300 of the present embodiment, the fuse element 250 is interposed between the first holding member 310Ba and the second holding member 310Bb. This insulates the fuse element 250 by bringing the fuse element proximal to or in contact with (adhered to) the first holding member 310Ba and the second holding member 310Bb.

Therefore, the space surrounding the fuse element 250 becomes extremely narrow, and the scale of arc discharge generated due to fusing is likely to be small. Therefore, according to the protective element 300 of the present embodiment, the size of the insulating case 310 can be made smaller and lighter.

The protective element of the present invention is not limited to the embodiments described above.

DESCRIPTION OF REFERENCE NUMERALS

10, 11, 310 Insulating case
10A, 110A, 310A Cover
10B, 10BB, 110B, 310B Holding member
10Ba, 10BBa, 110Ba, 310Ba First holding member
10Bb, 10BBb, 110Bb, 310Bb Second holding member
310Bc Third holding member
20, 120, 320 Shielding member
30 Pressing means
40, 140 Fuse element stacked body
50*a*, 50*b*, 50*c*, 50*d*, 50*e*, 50*f* Fusible conductor sheet
51, 251 First end portion
52, 252 Second end portion
53 Fusion portion
54 Through hole
60A, 60Aa, 60Ab, 60Ac, 60Ad, 60Ae, 60Af, 160A, 160Aa, 160Ab, 160Ac, 160Ad, 160Ae, 160Af, 160Ag, 260A First insulating member
60B Second insulating member
64, 65 Gap
64A First opening
65A Second opening
67, 67A Ventilation hole
70, 170, 370 Locking member
80 Heat-generating body
90 Power supply member
91, 291 First terminal
92, 292 Second terminal
100, 200, 300 Protective element
250 Fuse element

The invention claimed is:

1. A protective element comprising:
a fuse element comprising: a first end portion; and a second end portion at an opposite end of the first end portion;
an insulating case that houses the fuse element;
a first terminal comprising: a first end connected to the first end portion of the fuse element; and a second end exposed on an outside of the insulating case;
a second terminal comprising: a first end connected to the second end portion of the fuse element; and a second end exposed on the outside of the insulating case;
a first insulating member having a first opening or a first separation part, and a second insulating member having a second opening or a second separation part, the first and second insulating members being disposed in a state proximal to or in contact with the fuse element;
a shielding member movable in a moving direction that allows the shielding member to insert into the first opening or the first separation part of the first insulating member and the second opening or the second separation part of the second insulating member, so as to divide the fuse element;
a pressing member that presses the shielding member in the moving direction;
a locking member that suppresses movement of the shielding member and that is not in contact with the fuse element;
a fixing member, as an optional component, that fixes the locking member to the insulating case;
a heat-generating body configured to heat and soften the locking member or the fixing member; and
a power supply member that carries current to the heat-generating body,
wherein a cutting pressing force is not applied by the pressing member and the shielding member to the fuse element other than when the current path is cut off, and
wherein the insulating case further houses the first insulating member, the second insulating member, the shielding member, the pressing member, the locking member, the heat-generating body, and a part of the power supply member.

2. The protective element of claim 1, wherein when the heat-generating body generates heat so as to soften the locking member or the fixing member, stress of the pressing member causes the shielding member to cut or release the locking member, and the shielding member moves through the second opening or the second separation part of the second insulating member and the first opening or the first separation part of the first insulating member to cut the fuse element, which cuts off energization of the fuse element.

3. The protective element of claim 1, wherein when the shielding member cuts the fuse element, the shielding member shields the fuse element in a current carrying direction of the fuse element.

4. The protective element of claim 1, wherein the pressing member is a spring.

5. The protective element of claim 1, wherein at least one of the first insulating member, the second insulating member, the shielding member, and the insulating case comprises a material having a tracking resistance index CTI of 500 V or more.

6. The protective element of claim 1, wherein at least one of the first insulating member, the second insulating member, the shielding member, and the insulating case comprises at least one resinous material selected from the group consisting of a polyamide-based resin and a fluorine-based resin.

7. The protective element of claim 1, wherein the fuse element comprises a stacked body comprising a low melting point metal layer and a high melting point metal layer in at least a portion thereof, the low melting point metal layer comprises tin, and the high melting point metal layer comprises silver or copper.

8. The protective element of claim 7, wherein the high melting point metal layer comprises two or more high melting point metal layers and the low melting point metal layer comprises one or more low melting point metal layers, and the stacked body has a structure in which the one or more low melting point metal layers are each disposed between the two or more high melting point metal layers in at least a portion thereof.

9. The protective element of claim 1, wherein the fuse element is formed of a single layer comprising silver or copper in at least a portion thereof.

10. The protective element of claim 1, wherein the fuse element comprises a fusion portion between the first end portion and the second end portion, and a cross-sectional area of the fusion portion in a current carrying direction from the first end portion to the second end portion of the fuse element is less than a cross-sectional area of each of the first end portion and the second end portion in the current carrying direction.

11. The protective element of claim 1, wherein a part of the locking member is in proximity to or in contact with the fuse element.

12. The protective element of claim 1, wherein the insulating case comprises at least two case components, and at least one case component of the at least two case components is integral with the first insulating member or with the second insulating member.

13. The protective element of claim 1, wherein the insulating case comprises at least two case components, and the fuse element is interposed between the at least two case components.

14. A protective element comprising:

a fuse element comprising: a first end portion; and a second end portion at an opposite end of the first end portion;

an insulating case that houses the fuse element;

a first terminal comprising: a first end connected to the first end portion of the fuse element; and a second end exposed on an outside of the insulating case;

a second terminal comprising: a first end connected to the second end portion of the fuse element; and a second end exposed on the outside of the insulating case;

a first insulating member having a first opening or a first separation part and disposed in a state proximal to or in contact with the fuse element;

a shielding member movable in a moving direction that allows the shielding member to insert into the first opening or the first separation part of the first insulating member, so as to divide the fuse element;

a pressing member that presses the shielding member in the moving direction;

a locking member that suppresses movement of the shielding member and that is not in contact with the fuse element; and a fixing member, as an optional component, that fixes the locking member to the insulating case, wherein a cutting pressing force is not applied by the pressing member and the shielding member to the fuse element other than when the current path is cut off, and wherein the insulating case further houses the first insulating member, the shielding member, the pressing member, and the locking member.

15. The protective element of claim 14, wherein when the shielding member cuts the fuse element, the shielding member shields the fuse element in a current carrying direction of the fuse element.

16. The protective element of claim 14, wherein the pressing member is a spring.

17. The protective element of claim 14, wherein at least one of the first insulating member, the shielding member, and the insulating case comprises a material having a tracking resistance index CTI of 500 V or more.

18. The protective element of claim 14, wherein at least one of the first insulating member, the shielding member, and the insulating case comprises at least one resinous material selected from the group consisting of a polyamide-based resin and a fluorine-based resin.

19. The protective element of claim 14, wherein the fuse element comprises a stacked body comprising a low melting point metal layer and a high melting point metal layer in at least a portion thereof, the low melting point metal layer comprises tin, and the high melting point metal layer comprises silver or copper.

20. The protective element of claim 19, wherein the high melting point metal layer comprises two or more high melting point metal layers and the low melting point metal layer comprises one or more low melting point metal layers, and the stacked body has a structure in which the one or more low melting point metal layers are each disposed between the two or more high melting point metal layers in at least a portion thereof.

21. The protective element of claim 14, wherein the fuse element is formed of a single layer comprising silver or copper in at least a portion thereof.

22. The protective element of claim 14, wherein the fuse element comprises a fusion portion between the first end portion and the second end portion, and a cross-sectional area of the fusion portion in a current carrying direction from the first end portion to the second end portion of the fuse element is less than a cross-sectional area of each of the first end portion and the second end portion in the current carrying direction.

23. The protective element of claim 14, wherein a part of the locking member is in proximity to or in contact with the fuse element.

24. The protective element of claim 14, wherein the insulating case comprises at least two case components, one case component of the at least two case components is integral with the first insulating member.

25. The protective element of claim 14, wherein the insulating case comprises at least two case components, and the fuse element is interposed between the at least two case components.

26. The protective element of claim 14, further comprising:

a heat-generating body configured to heat and soften the locking member or the fixing member; and a power supply member that carries current to the heat-generating body, wherein when the heat-generating body generates heat so as to soften the locking member or the fixing member, stress of the pressing member causes the shielding member to cut or release the locking member, and the shielding member moves through the first opening or the first separation part of the first insulating member to cut the fuse element, which cuts off energization of the fuse element.

* * * * *